US010678117B2

(12) United States Patent
Shin et al.

(10) Patent No.: US 10,678,117 B2
(45) Date of Patent: Jun. 9, 2020

(54) OPTICAL PHASED ARRAY (OPA)

(71) Applicant: Samsung Electronics Co., Ltd., Suwon-si, Gyeonggi-do (KR)

(72) Inventors: Dong-jae Shin, Seoul (KR); Hyun-il Byun, Seongnam-si (KR); Kyoung-ho Ha, Seoul (KR); Seong-gu Kim, Pyeongtaek-si (KR); Jin-kwon Bok, Suwon-si (KR); Jung-ho Cha, Yongin-si (KR); Dong-hyun Kim, Hwaseong-si (KR); Yong-sang Park, Seoul (KR); Min-kyung Kim, Yongin-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 534 days.

(21) Appl. No.: 15/462,147

(22) Filed: Mar. 17, 2017

(65) Prior Publication Data

US 2018/0052378 A1 Feb. 22, 2018

(30) Foreign Application Priority Data

Aug. 17, 2016 (KR) .................. 10-2016-0104499

(51) Int. Cl.
*G02F 1/29* (2006.01)
*G01S 17/36* (2006.01)
(Continued)

(52) U.S. Cl.
CPC ............ *G02F 1/292* (2013.01); *G01S 7/4813* (2013.01); *G01S 7/4814* (2013.01); *G01S 7/4817* (2013.01);
(Continued)

(58) Field of Classification Search
CPC ..... G02F 1/292; G02F 1/2955; G02B 3/0087; G02B 27/4255; G02B 5/32; G02B 17/006
See application file for complete search history.

(56) References Cited

U.S. PATENT DOCUMENTS 8,659,748 B2    2/2014   Dakin et al.
8,988,754 B2    3/2015   Sun et al.
(Continued)

FOREIGN PATENT DOCUMENTS

KR    20150116239 A    10/2015
KR    20150132109 A    11/2015

OTHER PUBLICATIONS

K. Acoleyen et al. "Off-chip beam steering with a one-dimensional optical phased array on silicon-on-insulator", May 9, 2009/vol. 34, No. 9 Optics Letters pp. 1477-1479.
(Continued)

*Primary Examiner* — Luke D Ratcliffe
(74) *Attorney, Agent, or Firm* — Harness, Dickey & Pierce, P.L.C.

(57) ABSTRACT

An optical phased array (OPA) may be included in a light detection and ranging (LiDAR) system and may be configured to perform beam steering. The OPA may include a cascading structure of splitters configured to enable a branch operation to be performed M times. Each splitter may split an input optical signal in a ratio of 1:1 and output the split input optical signal. The OPA may include a plurality of sets of first phase shifters (PSs), each set of first PSs located exclusively on one output end of a separate splitter, each set of first PSs including a particular quantity of first PSs based on a branch position at which the separate splitter is located. The OPA may be included in a LiDAR system that is further
(Continued)

included in a vehicle that is configured to enable navigation of the vehicle, including autonomous navigation, through an environment.

20 Claims, 15 Drawing Sheets

(51) Int. Cl.
*G01S 17/42* (2006.01)
*G01S 7/481* (2006.01)
*G01S 17/931* (2020.01)
*G01S 17/89* (2020.01)
*G01S 17/93* (2020.01)
*G02F 1/31* (2006.01)

(52) U.S. Cl.
CPC .............. *G01S 17/36* (2013.01); *G01S 17/42* (2013.01); *G01S 17/89* (2013.01); *G01S 17/93* (2013.01); *G01S 17/931* (2020.01); *G02F 2001/311* (2013.01); *G02F 2201/06* (2013.01); *G02F 2203/10* (2013.01); *G02F 2203/50* (2013.01)

(56) References Cited

U.S. PATENT DOCUMENTS

| | | | |
|---|---|---|---|
| 9,104,086 B1 | 8/2015 | Davids et al. | |
| 2014/0259659 A1 | 9/2014 | Kleinert | |
| 2014/0376001 A1* | 12/2014 | Swanson | ................ G01N 21/17 356/479 |
| 2015/0346340 A1 | 12/2015 | Yaacobi et al. | |
| 2015/0378241 A1* | 12/2015 | Eldada | .................... G02F 1/292 359/15 |

OTHER PUBLICATIONS

A. Yaacobi et al. "Integrated phased array for wide-angle beam steering," Aug. 1, 2014/vol. 39, No. 15 Optic Letters, pp. 4575-4578.

\* cited by examiner

OPTICAL PHASED ARRAY (OPA)

CROSS-REFERENCE TO RELATED APPLICATIONS

This application claims the benefit under 35 U.S.C. § 119 of Korean Patent Application No. 10-2016-0104499, filed on Aug. 17, 2016, in the Korean Intellectual Property Office, the disclosure of which is incorporated herein in its entirety by reference.

BACKGROUND

The inventive concepts relate to light detection and ranging (LiDAR) systems, and more particularly, to optical phased arrays (OPA) configured for beam steering that may be included in LiDAR systems.

Light detection and ranging (LiDAR) is a method for measuring the presence and movement of objects (e.g., solid objects, vapor, dust, gases, aerosols, or cloud particles) in an environment by using laser light, and is also known as laser radar. For example, a LiDAR may involve emitting laser light, such as visible light or infrared rays, and measuring a distance to an object or a meteoric phenomenon by using reflected or scattered light that is reflected and/or scattered by the object based on the emitted laser light. Examples of LiDAR systems may include a Doppler radar that measures a velocity of a fine target that moves at a low speed by using the fact that laser light produces a greater Doppler effect than microwaves, and a Raman radar that analyzes components of a target object by using a Raman-shift.

Recently, LiDAR has been applied in sensors or scanners of intelligent vehicles and smart cars (e.g., autonomous vehicles, vehicles configured to engage in autonomous navigation, vehicles configured to be driven autonomously, etc.) to detect one or more various objects (e.g., obstacles) in an environment through which the vehicles may be navigated. In such cases, LiDAR systems may generally include a plurality of antennas and a beam steering device configured to emit laser light to a target point.

SUMMARY

The inventive concepts may provide an optical phased array (OPA) for beam steering and a light detection and ranging (LiDAR) system including the OPA, which may provide improved reliability, a reduction in size, and a lower cost.

According to some example embodiments of the inventive concepts, an optical phased array (OPA) may include: a set of splitters, a plurality of sets of first phase shifter (PSs), and a set of antennas. Each splitter may be configured to split an input optical signal in a ratio of 1:1 and output the split input optical signal. Each splitter may include an input end and a set of two output ends. Each set of two output ends may include a first output end and a second output end. The set of splitters may have a full binary tree structure including M branch positions, M being an integer equal to or greater than 1, such that the full binary tree structure is configured to enable a branch operation to be performed M times. Each splitter may be located at a branch position of the full binary tree structure. Each set of first PSs may be located exclusively on a first output end of each splitter, of the set of two output ends of the splitter, respectively. Each given set of first PSs may include a particular quantity of first PSs based on the branch position of the first output end at which the given set of first PSs is located. The set of antennas may be connected to separate, respective output ends of the splitters located at the $M^{th}$ branch position, respectively. The antennas may correspond to N channels, N being equal to $2^M$.

According to some example embodiments of the inventive concepts, an optical phased array (OPA) may include a set of 1×2 splitters, a plurality of sets of first phase shifters (PSs), a set of N antennas, and a set of second PSs. Each 1×2 splitter may be configured to equally split an input optical signal into two output signals and output the two output signals. The set of 1×2 splitters may have a cascading structure including M branch positions, M being an integer equal to or greater than 1, such that the cascading structure is configured to enable a branch operation to be performed M times. $2^{i-1}$ 1×2 splitters may be located at an $i^{th}$ branch position, i being inclusively between 1 and M. Each set of first PSs may be located exclusively on a first output end of each 1×2 splitter, of the set of two output ends of the 1×2 splitter, respectively. $2^{M-i}$ first PSs may be located on the first output end of the 1×2 splitters that are located at the $i^{th}$ branch position. The set of N antennas may be connected to separate, respective output ends of the 1×2 splitters located at an $M^{th}$ branch position, N being equal to $2^M$. The set of second PSs may be located on front ends of separate, respective antennas of one of an entirety of the set of N antennas, or N−1 antennas of the set of N antennas.

According to some example embodiments of the inventive concepts, an optical integrated circuit may include a wavelength-tunable laser diode (LD), an optical phased array (OPA, and a receiver. The OPA may be configured to equally split an optical signal from the wavelength-tunable LD to N ($N=2^M$) channels based on performing a branch operation M times and outputting the split optical signal in one or more particular directions through a set of antennas corresponding to the N channels, M being an integer equal to or greater than 1. The receiver may be configured to receive an optical signal reflected from an object based on the split optical signal being outputted. The wavelength-tunable LD, the OPA, and the receiver may be integrated in a bulk-silicon substrate.

According to some example embodiments of the inventive concepts, a light detection and ranging (LiDAR) system may include a wavelength-tunable laser diode (LD), an optical phased array (OPA), a receiver, and a controller. The OPA may be configured to equally split an optical signal from the wavelength-tunable LD to N ($N=2^M$) channels based on performing a branch operation M times and outputting the split optical signal in one or more particular directions through a set of antennas corresponding to the N channels, M being an integer equal to or greater than 1. The receiver may be configured to receive an optical signal reflected from an object based on the split optical signal being outputted. The controller may be configured to control the wavelength-tunable LD, the OPA, and the receiver.

According to some example embodiments of the inventive concepts, an optical phased array (OPA) may include a cascading structure of splitters configured to enable a branch operation to be performed M times and a plurality of sets of first phase shifters (PSs). The cascading structure may have M branch positions. The cascading structure may further include $2^{i-1}$ splitters at an $i^{th}$ branch position. Each splitter may be configured to split an input optical signal in a ratio of 1:1 and output the split input optical signal. Each splitter may include an input end and a set of two output ends, each set of two output ends including a first output end and a second output end. M may be an integer equal to or greater than 1, and i may be inclusively between 1 and M. Each set of first PSs may be located exclusively on one output end of a separate splitter, of a set of two output ends of the separate splitter, respectively, each set of first PSs including a particular quantity of first PSs based on the branch position at which the separate splitter is located.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EXAMPLE EMBODIMENTS

Figure 1:
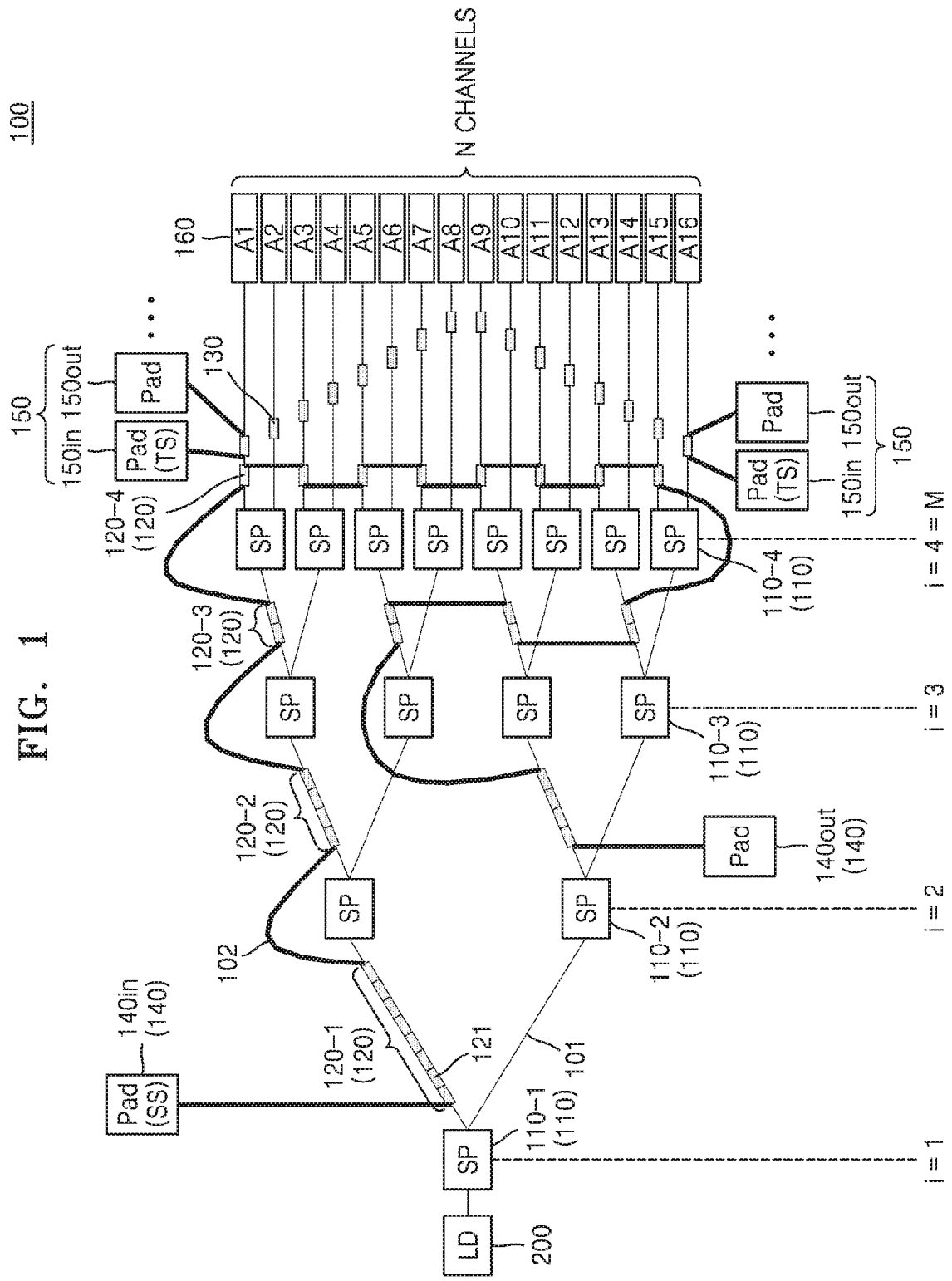
FIG. 1 is a diagram illustrating a configuration of an optical phased array (OPA) according to some example embodiments.

The inventive concepts will now be described more fully with reference to the accompanying drawings, in which example embodiments of the inventive concepts are shown. The same elements in the drawings are denoted by the same reference numerals, and thus a repeated explanation thereof will not be given.

FIG. 1 is a diagram illustrating a configuration of an optical phased array (OPA) 100 according to some example embodiments.

Referring to FIG. 1, the OPA 100 according to some example embodiments may include a splitter 110, a one or more sets of one or more first phase shifters (PS) 120, a set of one or more second PSs 130, and a set of antennas 160.

A splitter 110 may be a 1×2 optical splitter that is configured to equally split a received input light or a received input optical signal in a ratio of 1:1 and outputs the split input light or optical signal. A splitter 110 may include an input end and a set of two output ends, each set of two output ends including a first output end and a second output end, such that the splitter 110 may receive an input optical signal via the input end and output the split optical signal via the set of two output ends. The splitter 110 may be formed on a bulk-silicon substrate. Examples of a splitter 110 may include a multi-mode interference (MMI) splitter, a Y-branch splitter, and a directional coupler (DC) formed on the bulk-silicon substrate. The MMI splitter will be explained below in detail with reference to FIG. 3B, and the Y-branch splitter will be explained below in detail with reference to FIGS. 4B and 4C.

As shown in FIG. 1, the set of splitters 110 may include a configuration ("arrangement") of splitters 110 that have a cascading structure in which an optical signal output from a laser diode (LD) 200 branches M (M is an integer equal to or greater than 1) times through the cascading structure. The cascading structure may thus include a set of splitters 110 that includes $2^{i-1}$ splitters 110 that may be located at an $i^{th}$ ($1 \leq i \leq M$, i.e., i is inclusively between 1 and M, i is an integer) branch position, and $2^i$ output ends of the $2^{i-1}$ splitters 110 may exist at the $i^{th}$ branch position. For example, as shown in the example embodiments illustrated in FIG. 1, if and/or when M is 4, one splitter 110-1 may be located and two output ends may exist at a first (i=1) branch position; two splitters 110-2 may be located and four output ends may exist at a second (i=2) branch position; four splitters 110-3 may be located and eight output ends may exist at a third (i=3) branch position; and finally, eight splitters 110-4 may be located and sixteen output ends may exist at a fourth (i=4) branch position. The output ends of the splitters 110-4 at the fourth branch position, which is a last ("final," $M^{th}$, etc.) branch position, corresponding to i=M=4, may be respectively connected to the antennas 160 that represent ("correspond to") N channels. A relationship $N=2^M$ may be established between N and M. A structure in which $2^M$ output ends are formed through a branch operation performed M times by the 1×2 splitter 110 may be a full binary tree structure. Also, to provide such a full binary tree structure, $2^M-1$ of the 1×2 splitters 110 may be included in the OPA 100.

For reference, output ends corresponding to N channels may be formed by using a branch structure other than a full binary tree structure. For example, an OPA may include output ends corresponding to N channels based on the OPA including a DC having unequal division characteristics. For example, if and/or when N is 4, a first DC of an OPA may split an input optical signal in a ratio of 1:3 and may output the split input optical signal to a first output end and a second output end of the first DC, and the first output end of the first DC may be directly connected to an antenna and the second output end of the first DC may be connected to a second DC. The second DC may split an input optical signal in a ratio of 1:2 and may output the split input optical signal, and a first output end of the second DC may be connected to an antenna and a second output end of the second DC may be connected to a third DC. The third DC may split an input optical signal in a ratio of 1:1 and may output the split input optical signal, and a first output end and a second output end of the third DC may be connected to antennas. Even when output ends corresponding to N channels using DCs having unequal division characteristics are formed, the number of DCs included in the OPA may be N-1, that is, $2^M-1$. Output ends corresponding to N channels may also be formed by using a full binary tree structure using DCs having equal division characteristics of 1:1.

A first PS 121 included in a set of first PSs 120 may shift a phase of input light or an optical signal and may output the phase-shifted input light or optical signal such that the antennas 160 are each configured to output an optical signal having a different phase. That is, a first PS 121 may shift a phase of an optical signal that passes through a waveguide by applying at least one of heat, light, current, voltage, and pressure to the waveguide. A first PS 121 may be formed on the bulk-silicon substrate. Examples of a first PS 121 may include a metal heater, a PIN PS, a PN PS, and a silicon-insulator-silicon capacitive (SISCAP) PS. The metal heater may be located near the waveguide and may shift a phase of an optical signal by applying heat to the waveguide. The PIN PS may shift a phase of an optical signal by horizontally applying current into the waveguide through a PIN diode structure. The PN PS may shift a phase of an optical signal by vertically applying a voltage to the waveguide through a PN diode structure. The SISCAP PS may shift a phase of an optical signal by vertically applying a voltage to the waveguide through a SISCAP waveguide structure. The PS using the metal heater will be explained below in detail with reference to FIG. 9, and the PN PS will be explained below in detail with reference to FIG. 10.

In the OPA 100 according to some example embodiments, including the example embodiments shown in FIG. 1, the plurality of sets of first PSs 120 may cause optical signals output from the antennas 160 to have different phases. As phases of optical signals vary, directions in which the optical signals are output from the antennas 160 may vary. Accordingly, directions in which optical signals are output ("emitted") from the antennas 160 may be adjusted to desired directions by appropriately adjusting phases of the optical signals by using the sets of first PSs 120. Accordingly, in the OPA 100 according to some example embodiments, optical signals of the antennas 160 may be output in a desired radiation pattern by adjusting phases of the optical signals by using the sets of first PSs 120.

To make phases of optical signals of the antennas 160 different from one another, a different quantity of first PSs 121 having the same or substantially the same characteristics (e.g., the same characteristics within manufacturing tolerances and/or material tolerances) may be located to correspond to the antennas 160. In other words, a different quantity of first PSs 121 having substantially the same characteristics may be located in different paths leading from the LD 200 to the antennas 160 through the cascading structure of the plurality of splitters 110. For example, as shown in FIG. 1, in a path corresponding to a first antenna A1, a set of first PSs 120-1 that is located at a first branch position may include eight first PSs 121, a set of first PSs 120-2 that is located at a second branch position may include four first PSs 121, a set of first PSs 120-3 that is located at a third branch position may include two first PSs 121, and a set of first PSs 120-4 that is located at a fourth branch position may include one first PS 121. Accordingly, in total, fifteen first PSs 121 may be included in the path corresponding to a first antenna A1. In some example embodiments, in a path corresponding to an eighth antenna A8, since eight first PSs 121 are located at a first branch position and no first PS 121 is located at second through fourth branch positions, in total, eight first PSs 121 may be included. In a path corresponding to a sixteenth antenna A16, since no first PS 121 is located at first through fourth branch positions, no first PS 121 may be included.

When the first PSs 121 having the same or substantially the same characteristics are included in the OPA 100, all of the first PSs 121 (e.g., an "entirety" of the first PSs 121) may have a same (e.g., "common") or substantially the same type and a same size. Since the first PSs 120 are formed to have the same type and the same size or substantially the same type and substantially the same size, the first PSs 121 may have substantially the same phase shift characteristics (e.g., the same phase shift characteristics within manufacturing tolerances and/or material tolerances). Accordingly, once a phase shift of one first PS 121 is determined, all phase shifts of all first PSs 121 may be automatically calculated according to the number ("quantity") of the first PSs 121 according to the antennas 160.

In the OPA 100 according to some example embodiments, each set of first PSs 120 may be located on only one output end from among two output ends of each of the splitters 110 (e.g., exclusively located on one output end of each splitter 110, of the set of two output ends of the splitter 110). If and/or when an output end on which the set of first PSs 120 is located from among two output ends of the splitters 110 is a first output end, $2^{M-i}$ first PSs 121 may be located on the first output end of each of the splitters 110 according to each branch position. For example, when M is 4, eight first PSs 121 may be included in the set of first PSs 120-1 that is located on a first output end of the splitter 110-1 at a first (i=1) branch position. Four first PSs 121 may be included in the set of first PSs 120-2 that is located on a first output end of each of two splitters 110-2 at a second (i=2) branch position. Two first PSs 121 may be included in the set of first PSs 120-3 that is located on a first output end of each of four splitters 110-3 at a third (i=3) branch position. Finally, one first PS 121 may be included in the set of first PSs 120-4 that is located on a first output end of each of eight splitters 110-4 at a fourth (i=4) branch position.

Since eight first PSs 121 are located at each branch position, the total number ("quantity") of the first PSs 121 may be 8*4=32. When the total number of the first PSs 121 is equal to N number of channels, since N/2 first PSs 121 in total are located at each branch position and a branch operation is performed M times, the total number of the first PSs 121 may be N/2*M. Since there is a relationship $N=2^M$, the total number of the first PSs 121 may be $N/2 * \log_2 N$.

The number ("quantity") of the first PSs 121 included in the OPA 100 according to some example embodiments may be much less than the number ("quantity") of PSs included in an OPA of the related art that is configured for beam steering using a 1×2 splitter. Since the OPA 100 of the example embodiments shown in FIG. 1 includes fewer first PSs 121 than the number of PSs in the OPA of the related art, the OPA 100 may be made compact and a LiDAR system may be made compact, in relation to the OPA of the related are and a LiDAR system including the OPA of the related art, respectively. The number ("quantity") of PSs of OPAs of the related art will be explained below in detail with reference to FIG. 2.

The set of second PSs may include second PSs 130 that are collectively located on each of output ends of the splitters 110-4 at a final, $M^{th}$ branch position. However, since the set of first PSs 120-4 is located on any one output end from among two output ends of each of the splitters 110-4 at the final branch position, each second PS 130 may be located on an output end of the set of first PSs 120-4 corresponding to the output end of the splitter 110-4 on which the set of first PSs 120-4 is located. A structure and an operation of the second PS 130 may be substantially the same as those of the first PSs 121 (e.g., the same within manufacturing tolerances and/or material tolerances). For example, each second PS 130 may be configured to shift a phase of an input optical signal, such that the antennas 160 are each configured to output an optical signal having a different phase, and each second PS 130 may output the phase-shifted input optical signal. Examples of the second PS 130 may include a metal heater, a PIN PS, a PN PS, and a SISCAP PS. However, a function of a second PS 130 may be different from a function of a first PS 121. That is, each second PS 130 may be configured to correct a variation of optical signals of a separate channel, that is, of a separate antenna 160 of the set of antennas 160. For example, though phase differences between optical signals of antennas 160 are to be kept uniform, phase differences between optical signals on output ends of the splitters 110-4 at a final branch position may fail to be kept uniform due to various factors, and errors may occur. The second PSs 130 may be configured to compensate for the errors.

The second PSs 130 may have a same or substantially same type and a same or substantially same size in relation to each other. In some example embodiments, the second PSs 130 may have different types and/or different sizes. This is because the first PSs 121 may be controlled together by a common pad 140 whereas the second PSs 130 may be individually controlled by pads 150 as shown in FIG. 1.

In more detail, in the OPA 100 of the example embodiments illustrated in FIG. 1, it is assumed that each first PS 121 is configured to shift a phase by using a steering signal SS, for example, current for steering. The first PSs 121 may have the same type and the same size as described above. Also, as shown in FIG. 1, the first PSs 121 may be connected in series between a common input pad 140in and a common output pad 140out. Accordingly, phase shifts of the first PSs 121 may be adjusted at one time (e.g., "concurrently") based on applying a common steering signal SS through the common input pad 140in. Also, phase shifts of optical signals according to antennas may be adjusted at one time according to the number of the first PSs 121. In contrast, since the second PSs 130 have to compensate for a phase variation of optical signals per channel, a separate input pad 150in and a separate output pad 150out may be connected to each of the second PSs 130, and a trimming signal TS may be individually input through the input pad 150in. Accordingly, the trimming signals TS may be different according to the second PSs 130. In FIG. 1, a thick line may correspond to a wiring line 102 in which current flows, and a thin line may correspond to a waveguide 101 through which an optical signal passes. The wiring line 102 and the waveguide 101 may be formed on the bulk-silicon substrate.

For reference, the pad 150 is connected only to the second PS 130 on a front end of each of the first antenna A1 and the sixteenth antenna A16 in FIG. 1 for convenience of explanation, but the pad 150 may actually be connected to each of the second PSs 130.

Although a steering signal or a trimming signal may be a current (e.g., electrical current, an electrical current having a particular magnitude, etc.) as indicated above, the steering signal or the trimming signal is not limited to being a current. For example, any of various physical quantities including voltage, pressure, heat, or light may be used as a steering signal or a trimming signal. A type of a PS may vary according to a type of an applied physical quantity, and a structure of wiring lines or a pad connected through the PS may also vary.

In some example embodiments, the second PS 130 on the front end of the sixteenth antenna A16 may be omitted. This is because, based on a phase of an optical signal of the sixteenth antenna A16, when a phase of another antenna 160 is corrected, the phase of the optical signal of the sixteenth antenna A16 does not need to be compensated for. Accordingly, the number of the second PSs 130 may be 16 or 15 according to whether the second PS 130 on the front end of the sixteenth antenna A16 is omitted. Also, when the number of channels is N, the number of the second PSs 130 may be N or N−1. Since the number of the first PSs 121 is $N/2*\log_2 N$ as described above, and the number of the second PSs 130 is N or N−1, the number of all PSs included in the OPA 100 according to some example embodiments, that is, a sum of the number of the first PSs 121 and the number of the second PSs 130, may be $N/2*\log 2N+N$ or $N/2*\log 2N+(N-1)$.

The antennas 160 may respectively correspond to channels and may be connected to separate, respective output ends of the splitters 110-4 at a final, $M^{th}$ branch position. In more detail, each of the antennas 160 may be respectively connected to each of the second PSs 130 located on the output ends of the splitters 110-4. The antennas 160 may be formed on the bulk-silicon substrate and may have a structure in which a grating is formed in a waveguide. A structure of each of the antennas 160 will be explained below in detail with reference to FIG. 11.

Although not shown in FIG. 1, in order to amplify an optical signal output from the LD 200 and/or amplify optical signals radiated through the antennas 160, the OPA 100 according to some example embodiments may include a semiconductor optical amplifier (SOA) located on an output end of the LD 200 and/or an input end of each of the antennas 160. The SOA will be explained below in detail with reference to FIGS. 3A and 3B.

For reference, since a LiDAR system of the related art changes directions of optical signals of antennas through mechanical rotation, the reliability of beam steering is low and it is difficult to reduce a size of the existing LiDAR system. Also, in the LiDAR system of the related art, since a light source, a light steering device, and a receiver are assembled as modules, it may be very difficult to lower costs. However, since the OPA 100 according to some example embodiments changes directions of optical signals of antennas by using PSs, the reliability of beam steering may be improved. Also, since the OPA 100 according to some example embodiments may perform beam steering by using a relatively small number of PSs, a size of the OPA 100 may be reduced. Furthermore, when the OPA 100 according to some example embodiments is applied to a LiDAR system, the reliability of the LiDAR system may be improved and the LiDAR system may have a compact design and a low cost.

Figure 2:
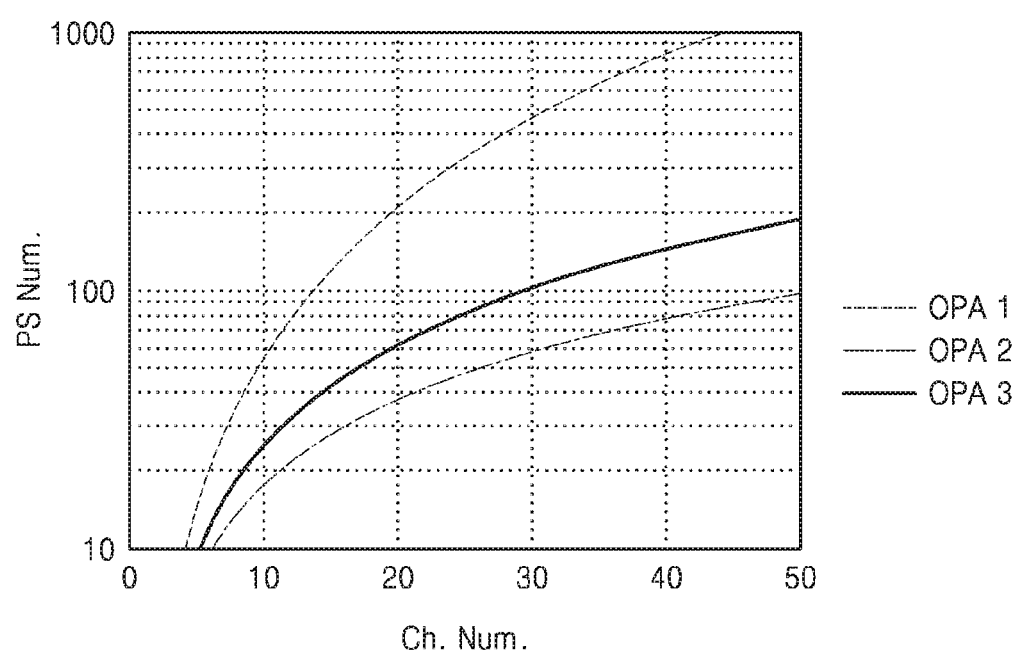
FIG. 2 is a graph illustrating the number of phase shifters (PSs) used in the OPA of FIG. 1 and the numbers of PSs used in OPAs of the related art for beam steering.

FIG. 2 is a graph illustrating the number of PSs used in the OPA 100 of FIG. 1 and the numbers of PSs used in OPAs of the related art for beam steering. The x-axis represents the number of channels, and the y-axis represents the number of PSs in a log scale. OPA 1 may be an OPA of the related art for beam steering including N channels formed by using a full binary tree structure, OPA 2 may be an OPA of the related art for beam steering including N channels formed by using DCs having unequal division characteristics, and OPA 3 may be the OPA 100 according to some example embodiments.

Referring to FIG. 2, in OPA 1, a different number of PSs may be located only on output ends of splitters at a final branch position. The term 'PSs' may embrace first PSs and second PSs. For example, when the number of channels is N, since one PS through N PSs are included, the total number of the PSs may be $N/2*(N+1)$. When no PS is located in a channel that becomes a reference channel, the total number of the PSs may be $N/2*(N+1)-1$.

Next, in OPA 2, one PS may be located on each of two output ends of a DC. For example, one PS(1-1) may be located on a first output end of a first DC and one PS(1-2) may be located on a second output end of the first DC at a first branch position. A first antenna may be connected to the PS(1-1), and a second DC at a second branch position may be connected to the PS(1-2); and one PS(2-1) may be located on a first output end of the second DC, and one PS(2-2) may be located on a second output end of the second DC. A second antenna may be connected to the PS(2-1), and a third DC at a third branch position may be connected to the PS(2-2); and one PS(3-1) may be located to a first output end of the third DC, and one PS(3-2) may be located to a second output end of the third DC. In this manner, one PS((N−1)−1) may be located on a first output end of an $(N-1)^{th}$ DC at an $(N-1)^{th}$ branch position and one PS((N−1)−2) may be located on a second output end of the $(N-1)^{th}$ DC at the $(N-1)^{th}$ branch position, an $(N-1)^{th}$ antenna may be connected to the PS((N−1)−1), one PS(N−1) may be located on the PS((N−1)−2), and an Nth antenna may be connected to the PS(N−1).

Except for a first antenna to which only one PS is connected, two PSs are located on each antenna, and thus the total number of the PSs may be 2*(N−1)+1. Also, when no PS is located in a channel that becomes a reference channel, for example, a first antenna, the total number of the PSs may be 2*(N−1).

In OPA 3 corresponding to the OPA 100 according to some example embodiments, the total number of PSs may be N/2*log 2N+N or N/2*log 2N+(N−1) as described above.

In OPA 3, the number of PSs is less than that of OPA 1, and a difference in the number of PSs greatly increases as the number of channels increases. Accordingly, when the number of channels is large, a structure of OPA 3 may more easily reduce a size and a cost of an OPA for beam steering than that of OPA 1. Although the number of PSs of OPA 2 is less than that of OPA 3, there may only be a slight difference between OPA 2 and OPA 3. OPA 2 uses DCs in order to split light as described above; these DCs are very sensitive to a process variation, and it is very difficult for the DCs to split light in a desired ratio according to wavelengths. Therefore, reliability is reduced and costs are increased.

In conclusion, the OPA 100 according to some example embodiments corresponding to OPA 3 may have an optimum structure for achieving a compact design, a low cost, and high reliability.

Figure 3A:
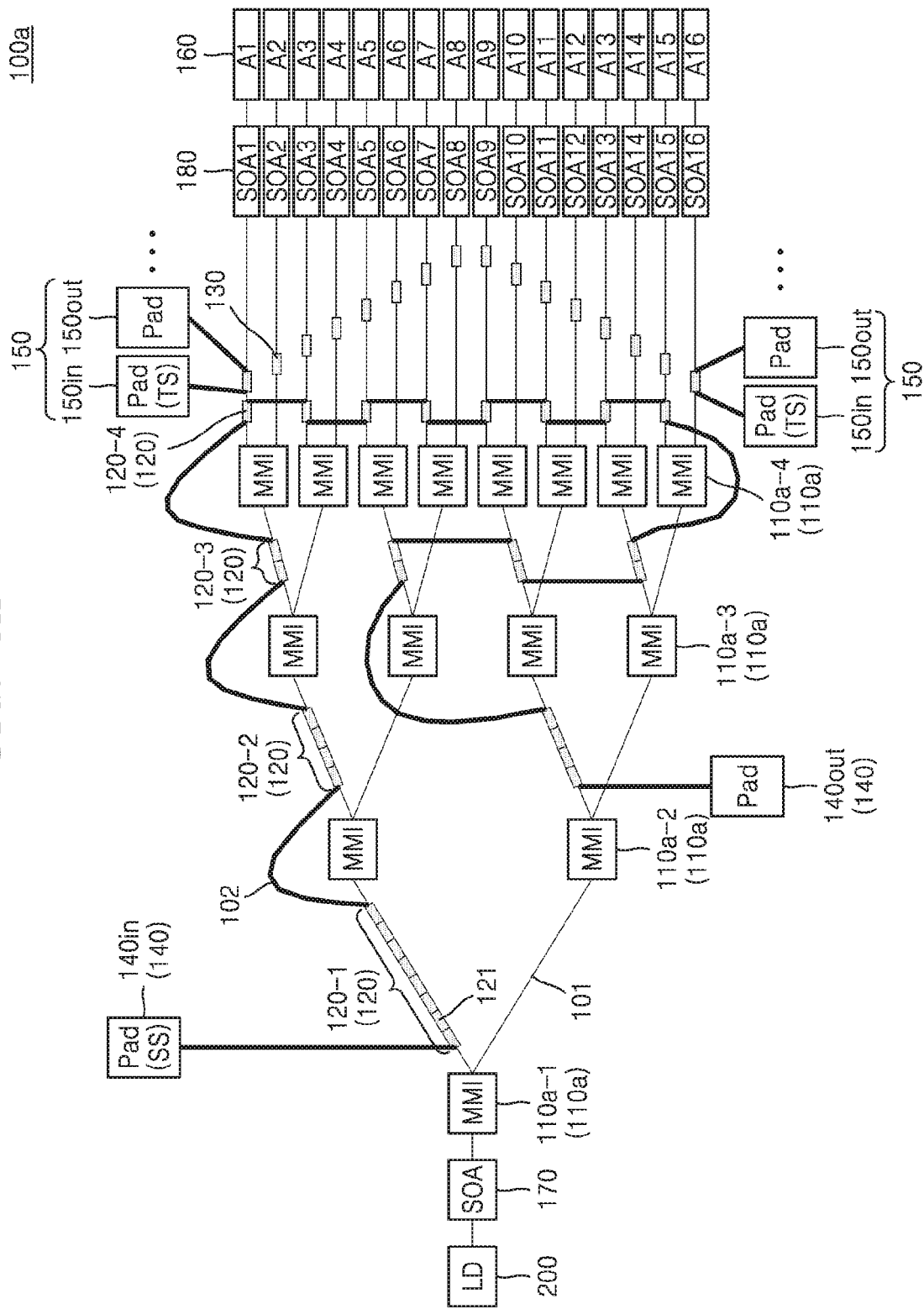
FIG. 3A is a diagram illustrating a configuration of an OPA for beam steering according to some example embodiments.
Figure 3B:
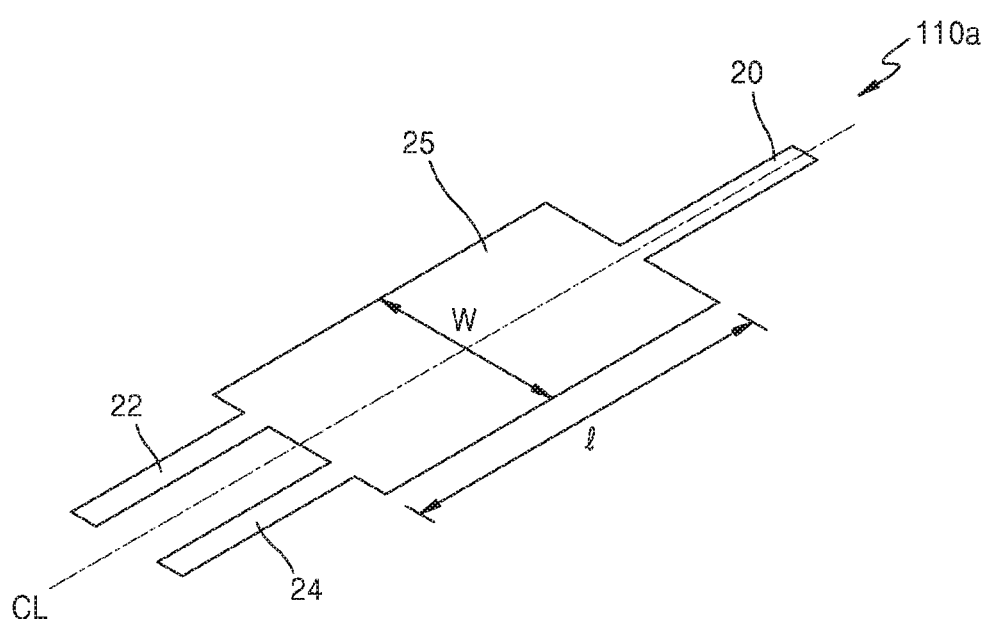
FIG. 3B is a plan view of a multi-mode interference (MMI) splitter used in the OPA of FIG. 3A.

FIG. 3A is a diagram illustrating a configuration of an OPA 100a for beam steering according to some example embodiments. FIG. 3B is a plan view of an MMI splitter 110a used in the OPA 100a of FIG. 3A.

Referring to FIGS. 3A and 3B, the OPA 100a according to some example embodiments may be similar to the OPA 100 of FIG. 1 except that the OPA 100a further includes an input SOA 170 and output SOAs 180. Also, the OPA 100a may employ the MMI splitter 110a as a 1×2 optical splitter.

The input SOA 170 may be located on an output end of the LD 200 and may amplify light output from the LD 200. The input SOA 170 may be formed as a Fabry-Perot amplifier (FPA) or a travelling wave amplifier (TWA) on a bulk-silicon substrate. An SOA of the related art may be made compact, may operate at wavelengths between 1310 nm and 1550 nm, and may transmit light in both directions. The input SOA 170 may have such characteristics. An MMI splitter 110a-1 at a first branch position may be located on an output end of the input SOA 170. When a wavelength of used light is 1550 nm, an erbium-doped fiber amplifier (EDFA) may be used instead of the input SOA 170.

The output SOAs 180 may be respectively located on front ends of the antennas 160 corresponding to N channels. For example, the output SOAs 180 may be located between the antennas 160 and the second PSs 130 located on output ends of MMI splitters 110a-4 at a final branch position. The output SOAs 180 may amplify optical signals from the second PSs 130 and may respectively apply the amplified optical signals to the antennas 160. The output SOAs 180 may also be formed as FPAs or TWAs on the bulk-silicon substrate. A structure or characteristics of each of the output SOAs 180 are the same as those of the input SOA 170.

As shown in FIG. 3B, the MMI splitter 110a may include an input waveguide region 20, a multi-mode waveguide region 25, and output waveguide regions 22 and 24. The input waveguide region 20 may be located along a central line CL of the multi-mode waveguide region 25, and the output waveguide regions 22 and 24 may be spaced apart from each other on either side of the central line CL of the multi-mode waveguide region 25. The multi-mode waveguide region 25 may have a first length 1 and a first width W. To provide beam division through multi-mode interference on the multi-mode waveguide region 25, the first length 1 and the first width W may have a relationship 1=W/2λ. A may correspond to a wavelength of light. For reference, when the MMI splitter generally splits input light into N parts, a relationship 1=W/NA may be established.

The MMI splitter 110a may be formed as a central core structure on the bulk-silicon substrate. The central core structure may be a structure in which upper and lower cladding layers are formed around a core of an epitaxial layer. An air layer may be located beside the core, or a separate side cladding layer may be located beside the core. The MMI splitter 110a may be formed as a hollow core structure instead of a central core structure. In the hollow core structure, a core through which light passes may be an empty air layer. However, a metal coating may be applied to a circumferential surface of the core in order to form the hollow core structure on the bulk-silicon substrate.

In the OPA 100a according to some example embodiments, since the input SOA 170 is located on the output end of the LD 200, the output SOAs 180 are located on the front ends of the antennas 160, and the MMI splitter 110a is used as a 1×2 optical splitter, the OPA 100a may have a compact design, a low cost, and high reliability.

Figure 4A:
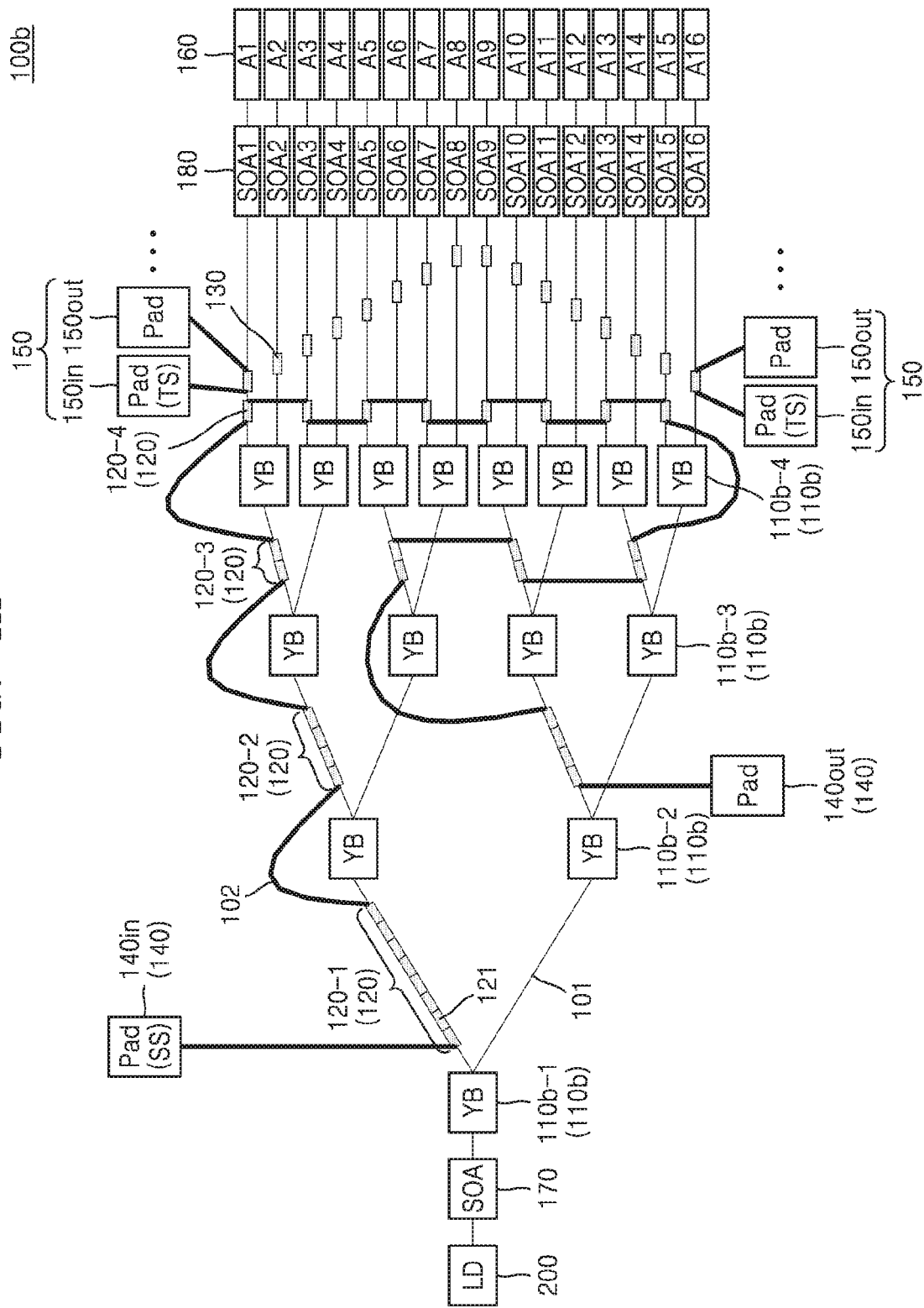
FIG. 4A is a diagram illustrating an OPA for beam steering according to some example embodiments.
Figure 4B:
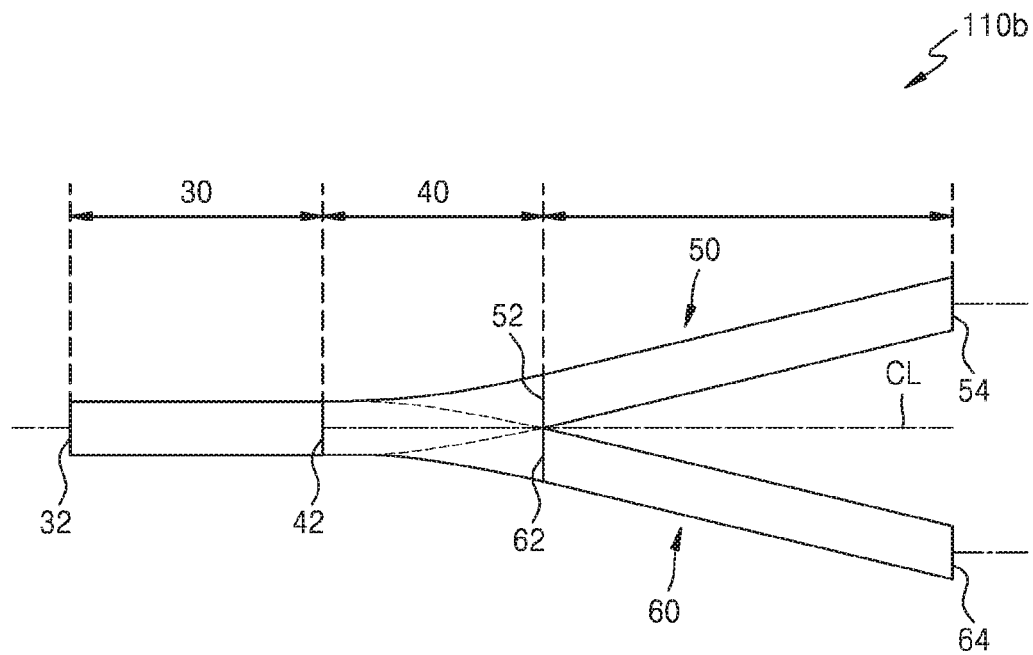
FIG. 4B and FIG. 4C are each a plan view of a Y-branch splitter used in the OPA of FIG. 4A.
Figure 4C:
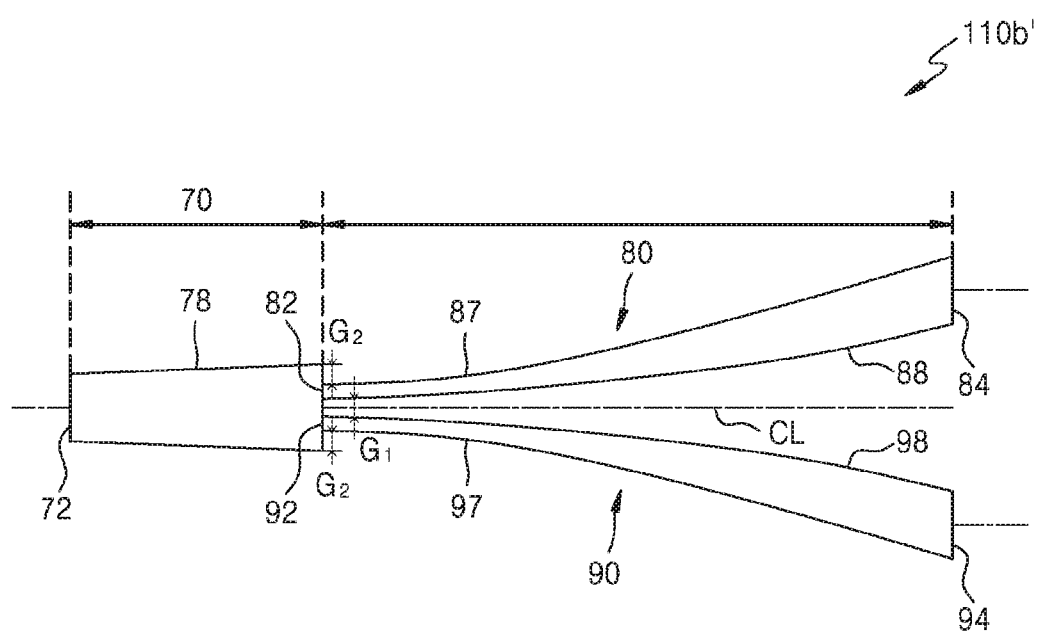

FIG. 4A is a diagram illustrating an OPA 100b for beam steering according to some example embodiments. FIGS. 4B and 4C are plan views of Y-branch splitters 110b and 110b' used in the OPA 100b of FIG. 4A.

Referring to FIGS. 4A through 4C, the OPA 100b according to some example embodiments may be different from the OPA 100a of FIG. 3A in that the Y-branch splitter 110b is used as a 1×2 optical splitter. Accordingly, the OPA 100b according to some example embodiments may also include the input SOA 170 located on an output end of the LD 200 and the output SOAs 180 located on front ends of the antennas 160.

The first Y-branch splitter 110b of FIG. 4B may include an input waveguide region 30, a tapered waveguide region 40, and output waveguide regions 50 and 60. The first Y-branch splitter 110b is a planar lightwave circuit (PLC) and may include a core having a high refractive index, and a cladding layer having a low refractive index surrounding the core, which are formed on a bulk-silicon substrate. An optical signal may travel to the core.

The input waveguide region 30 may have a linear shape, and the tapered waveguide region 40 may widen in a direction in which an optical signal travels. The output waveguide regions 50 and 60 may extend so that there is a predetermined angle between each of the output waveguide regions 50 and 60 and a central line CL of the tapered waveguide region 40, and the output waveguide regions 50 and 60 are arranged symmetrically on either side of the central line CL of the tapered waveguide region 40.

An optical signal may be input to a first cross-section 32 of the input waveguide region 30, may pass through the input waveguide region 30, and may be input to a second cross-section 42 of the tapered waveguide region 40. Next, the optical signal may branch into two optical signals at third cross-sections 52 and 62 of the tapered waveguide region 40, and may be input to the output waveguide regions 50 and 60. Each of the two optical signals may respectively pass through the output waveguide regions 50 and 60 and may respectively be output through fourth cross-sections 54 and 64.

A second Y-branch splitter 110b' of FIG. 4C may include an input tapered waveguide region 70 and output tapered waveguide regions 80 and 90. The second Y-branch splitter 110b' is a PLC and may include a core having a high refractive index, and a cladding layer having a low refractive index surrounding the core, which are formed on a bulk-silicon substrate.

A width of the input tapered waveguide region 70 may increase in a direction in which an optical signal travels. The output tapered waveguide regions 80 and 90 may extend respectively from second cross-sections 82 and 92 of the input tapered waveguide region 70 and may bend at a predetermined curvature to have arc shapes. Also, the output tapered waveguide regions 80 and 90 may extend so that a width of each of the output tapered waveguide regions 80 and 90 increases in a direction in which an optical signal travels, and the output tapered waveguide regions 80 and 90 may be arranged symmetrically on either side of a central line CL. Inner surfaces 88 and 98 of the output tapered waveguide regions 80 and 90 may be spaced apart from each other by a first interval G1 at the second cross-sections 82 and 92. Also, each of outer surfaces 87 and 97 of the output tapered waveguide regions 80 and 90 and an outer surface 78 of the input tapered waveguide 70 may be spaced apart from each other by a second interval G2 at the second cross-sections 82 and 92.

An optical signal may be input to a first cross-section 72 of the input tapered waveguide region 70, may branch into two optical signals at the second cross-sections 82 and 92, and may be input to the output tapered waveguide regions 80 and 90. Each of the two optical signals may respectively pass through the output tapered waveguide regions 80 and 90, and may then respectively be output through third cross-sections 84 and 94.

Figure 5A:
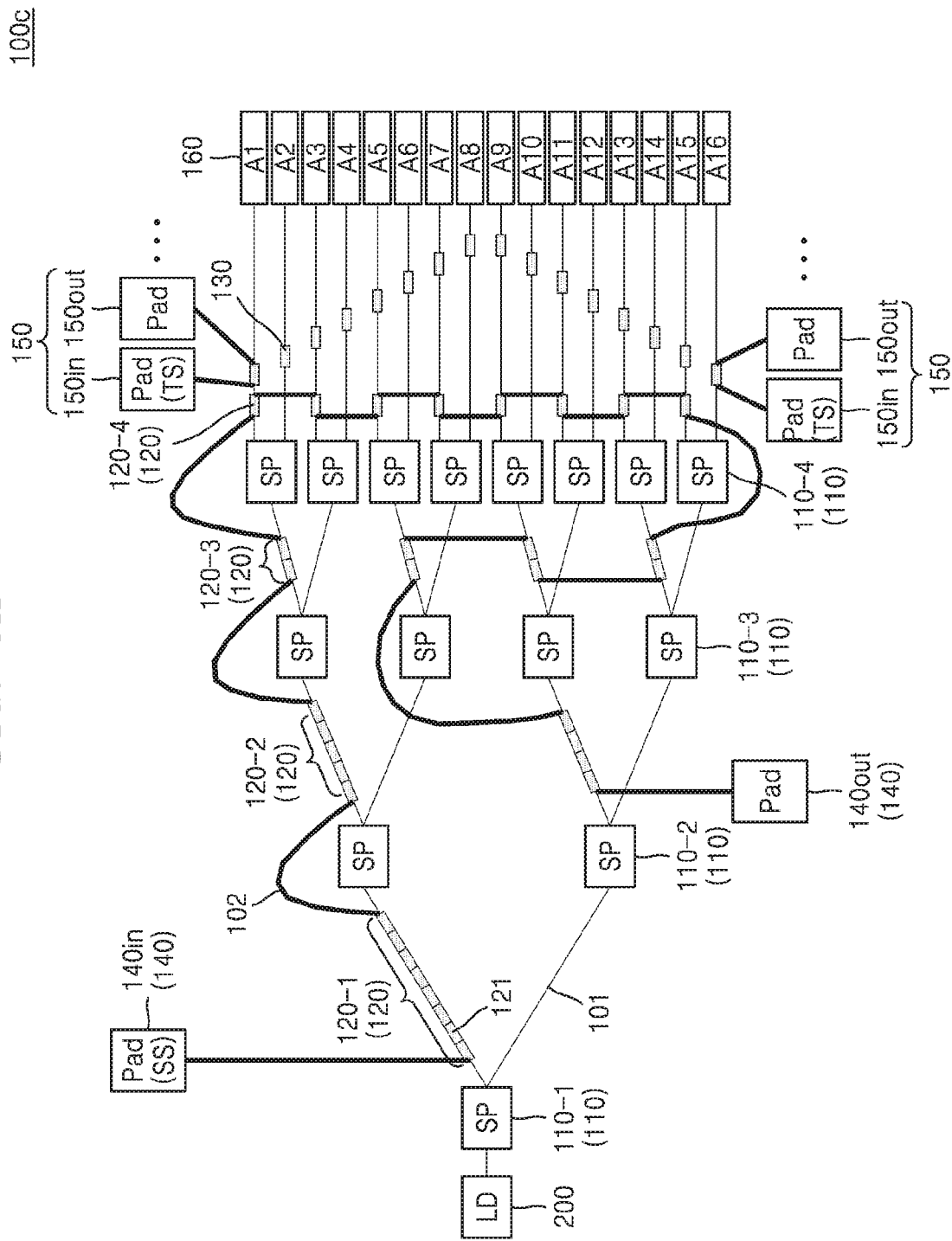
FIG. 5A and FIG. 5B are diagrams illustrating configurations of OPAs for beam steering according to some example embodiments.
Figure 5B:
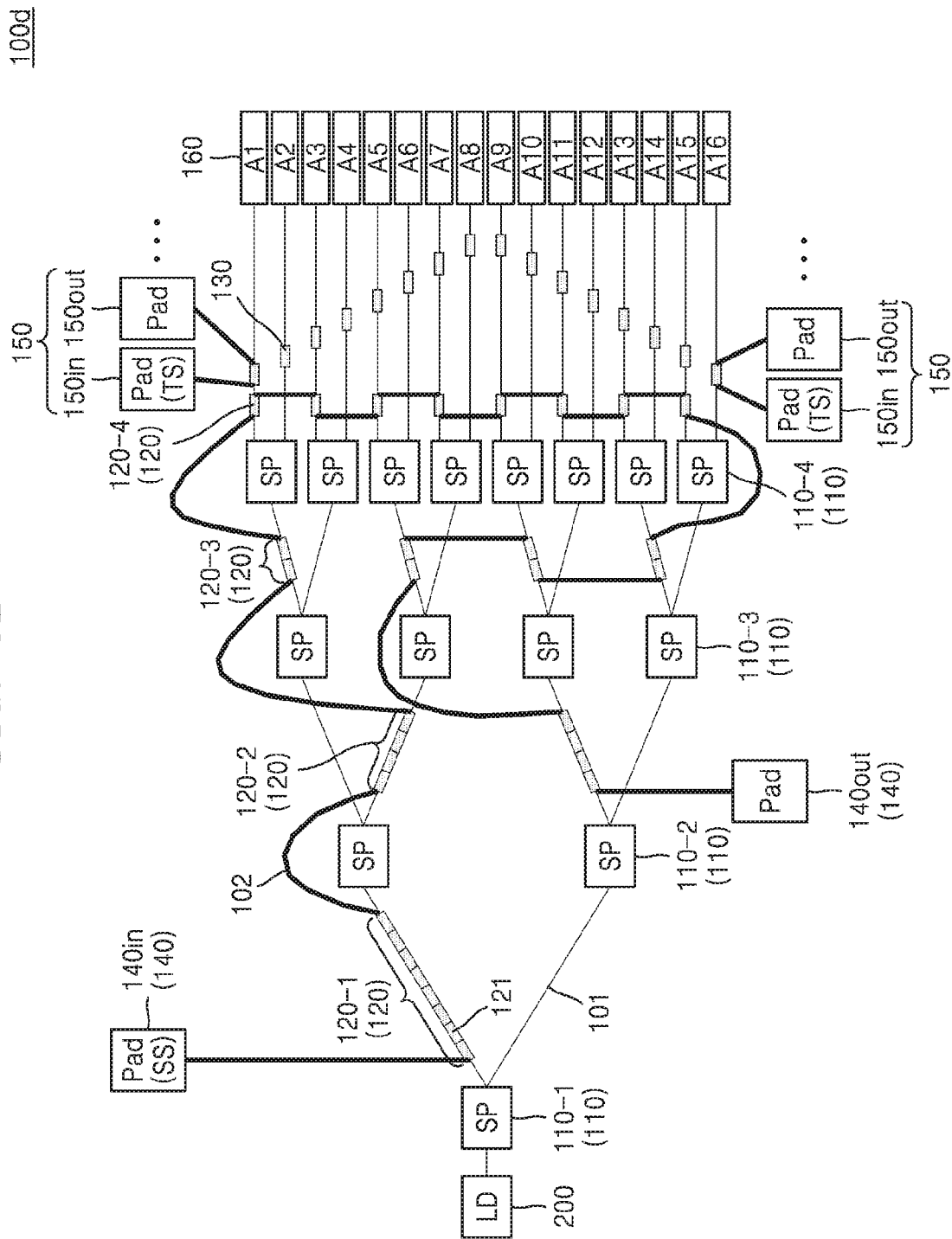

FIGS. 5A and 5B are diagrams illustrating configurations of OPAs 100c and 100d for beam steering according to some example embodiments.

Referring to FIG. 5A, the OPA 100c according to some example embodiments may have a different number of the first PSs 121 from that of the OPA 100 of FIG. 1. In detail, in the OPA 100c according to some example embodiments, five first PSs 121 may be included in a set of first PSs 120-2 that is located on upper output ends of an upper splitter from among two splitters 110-2 at a second branch position. In this case, thirteen first PSs 121 may be located in a path of a fourth antenna A4 and eleven first PSs 121 may be located in a path of a fifth antenna A5, and thus a difference in the number of the first PSs 121 between adjacent antennas may be 2. However, since a different number of PSs 121 and 130 are located in paths of all of the antennas 160, phases of optical signals of the antennas 160 may be different from one another.

In the OPA 100c according to some example embodiments, although the number of the first PSs 121 included in the set of first PSs 120-2 on the upper output end of the upper splitter 110-2 at the second branch position is increased, the present example embodiments are not limited thereto. For example, the number of the first PSs 121 included in sets 120-1, 120-3, and 120-4 may be increased on at least one from among an upper output end of the splitter 110-1 at a first branch position, an upper output end of the highest splitter 110-3 at a third branch position, and an upper output end of the highest splitter 110-4 at a fourth branch position. Also, the number that is increased is not limited to one and may be increased by two or more.

Referring to FIG. 5B, the OPA 100d according to some example embodiments may be different from the OPA 100 of FIG. 1 in a position of the first PS 121. In detail, the OPA 100d according to some example embodiments, four first PSs 121 may be included in a set of first PSs 120-2 that is located on a lower output end (e.g., the second output end) of the upper splitter 110-2 from among two splitters 110-2 at a second branch position. In this case, although there is a difference between the OPA 100d of FIG. 5B and the OPA 100 of FIG. 1 in that the numbers of the first PSs 121 in paths of the first through fourth antennas A1, A2, A3, and A4 and the numbers of the first PSs 121 in paths of the fifth through eighth antennas A5, A6, A7, and A8 are exchanged with each other, the OPA 100d of FIG. 5B and the OPA 100 of FIG. 1 are the same in that a different number of PSs 121 and 130 are located in paths of all of the antennas 160. Accordingly, phases of optical signals of the antennas 160 may be made different from one another by using the different number of PSs 121 and 130.

In conclusion, the inventive concepts may apply to any OPA structure for beam steering in which the first PS 121 is located only on any one output end from among two output ends of each of the splitters 110 at each branch position, and a different number of first PSs 121 are located in paths of N antennas 160.

Figure 6:
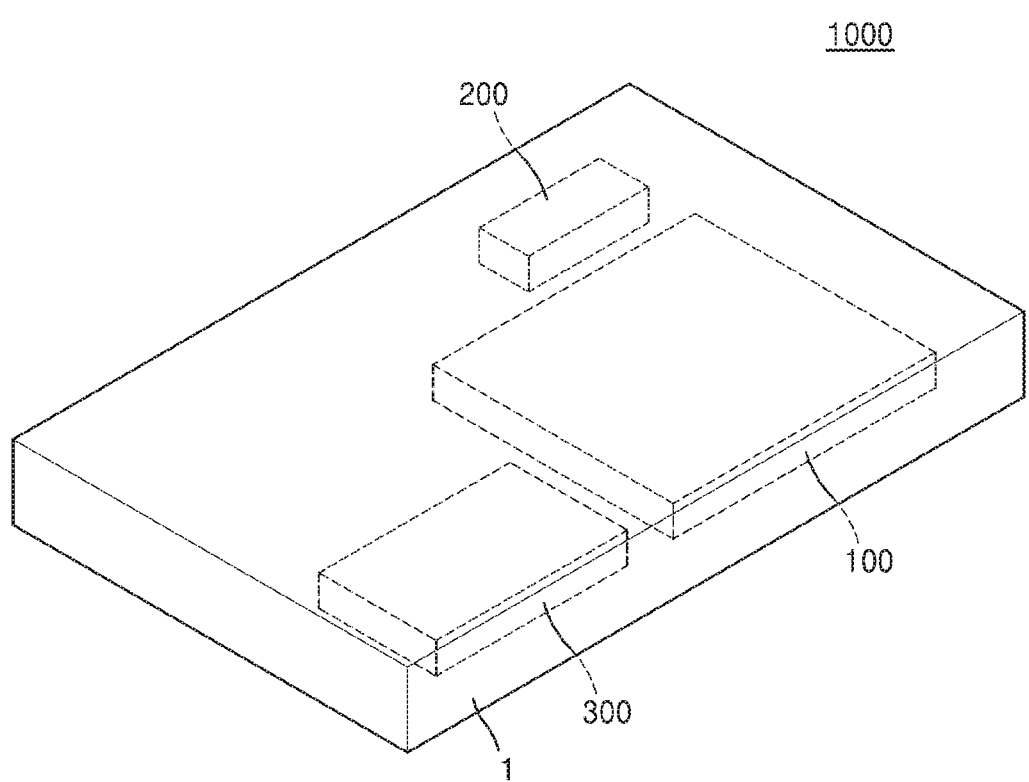
FIG. 6 is a perspective view of an optical integrated circuit including the OPA according to some example embodiments.

FIG. 6 is a perspective view of an optical integrated circuit 1000 including the OPA 100 according to some example embodiments.

Referring to FIG. 6, the optical integrated circuited 1000 according to some example embodiments may include the OPA 100, the LD 200, and the receiver 300 integrated in a bulk-silicon substrate 1. An arrangement of the OPA 100, the LD 200, and the receiver 300 in the bulk-silicon substrate 1 may be modified in various ways without being limited to the arrangement of FIG. 6.

The OPA 100 has been described with reference to FIG. 1. Any of the OPAs 100a, 100b, 100c, and 100d of FIGS. 3A, 4A, 5A, and 5B, instead of the OPA 100 of FIG. 1, may be used in the optical integrated circuit 1000.

The LD 200 may be a semiconductor laser device based on the bulk-silicon substrate 1. The LD 200 may be manufactured to have a small size of hundreds of μm. Also, the LD 200 has low driving power, and thus laser light may be directly modulated by applying current. The LD 200 may obtain lasing wavelengths ranging from visible light to infrared rays by selectively combining semiconductor materials. For example, the LD 200 may be a wavelength-tunable LD that may change lasing wavelengths according to a predetermined range. The LD 200 may output laser light as pulse waves (PWs) or continuous waves (CWs).

The receiver 300 may be a sensor that receives an optical signal radiated through the antenna 160 and reflected from an object. For example, the receiver 300 may include a photodiode based on the bulk-silicon substrate 1. The receiver 300 may be formed so as to include a plurality of photodiodes in an array in the bulk-silicon substrate 1. Alternatively, the receiver 300 may include one photodiode.

For reference, a technology of forming optical devices based on a silicon substrate is referred to as a silicon photonics technology. In the optical integrated circuit 1000 according to some example embodiments, the OPA 100, the LD 200, and the receiver 300 may be integrated together in the bulk-silicon substrate 1 by using a silicon photonics technology. Accordingly, in the optical integrated circuit 1000 according to some example embodiments, since various optical devices are integrated together in the bulk-silicon substrate 1, an optical device system having a low cost, a compact design, and high reliability may be realized. For example, the optical integrated circuit 1000 according to some example embodiments may constitute a LiDAR system along with controllers for controlling the OPA 100, the LD 200, and the receiver 300, and the LiDAR system may have a low cost, a compact design, and high reliability. The LiDAR system will be explained below in detail with reference to FIGS. 12 through 13B.

Figure 7:
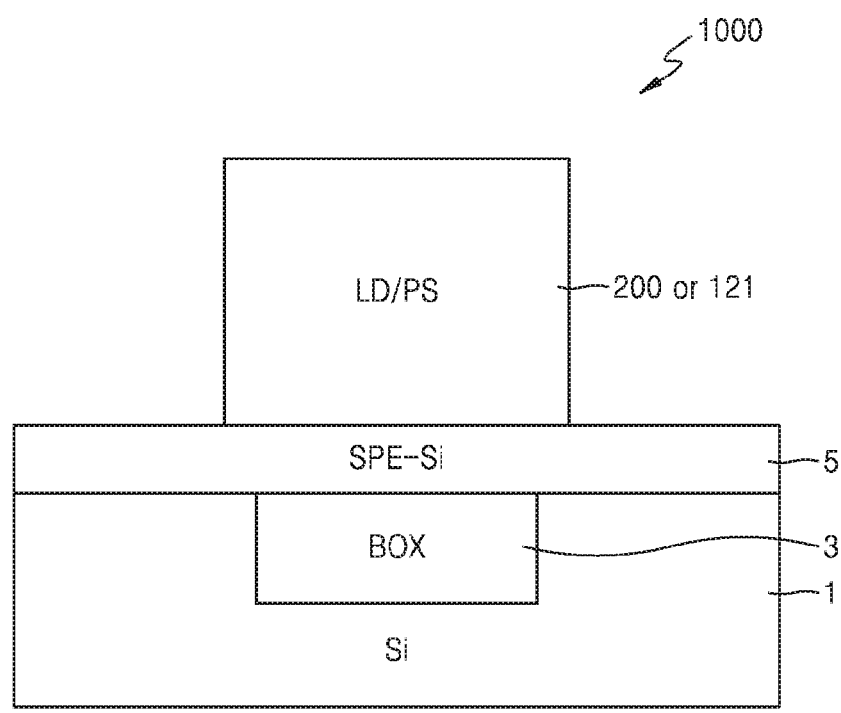
FIG. 7 is a cross-sectional view of a laser diode (LD) or a PS formed on a bulk-silicon substrate in an optical integrated circuit according to some example embodiments.

FIG. 7 is a cross-sectional view of the LD 200 or a PS 121 formed on the bulk-silicon substrate 1 in the optical integrated circuit 1000 according to some example embodiments.

Referring to FIG. 7, in the optical integrated circuit 1000 according to some example embodiments, the LD 200 or the PS 121 may be formed on the bulk-silicon substrate 1. The PS 121 may be the first PS 121 or the second PS 130 in the OPA 100 of FIG. 1. A buried insulating layer BOX 3 may be formed in an upper portion of the bulk-silicon substrate 1. The buried insulating layer 3 may, for example, be formed of an oxide film such as silicon oxide (SiOx). However, a material used to form the buried insulating layer 3 is not limited to the oxide film.

An epitaxial layer 5 may be formed on the bulk-silicon substrate 1 and the buried insulating layer 3. The epitaxial layer 5 may be formed by using epitaxial growth. The epitaxial growth may refer to the growth of single crystal thin films having the same crystal structure along a substrate crystal axis on a surface of a silicon substrate. The epitaxial layer 5 may be formed on the bulk-silicon substrate 1 and the buried insulating layer 3 by using, for example, solid phase epitaxial (SPE) growth.

A material layer for the LD 200 or the PS 121 may be formed on the epitaxial layer 5. A square block on the epitaxial layer 5 indicates the LD 200 or the PS 121 in FIG. 7 for convenience of explanation, but various material layers may be included in the LD 200 or the PS 121. Also, the LD 200 or the PS 121 may include parts of the bulk-silicon substrate 1, the buried insulating layer 3, and the epitaxial layer 5 as elements.

In the optical integrated circuit 1000 according to some example embodiments, the LD 200 or the PS 121 may be formed based on the bulk-silicon substrate 1. The bulk-silicon substrate 1 is inexpensive and has very high thermal conductivity. Accordingly, heat generated in the LD 200 or the PS 121 may be easily dissipated downward through the bulk-silicon substrate 1. The high heat dissipation efficiency of the bulk-silicon substrate 1 may help to improve the reliability of the LD 200 or the PS 121. For reference, the LD 200 or the PS 121 may be formed based on a silicon-on-insulator (SOI) substrate. However, in this case, the SOI substrate may be very expensive and may have low heat dissipation efficiency due to the existence of an intermediate insulating layer.

Figure 8:
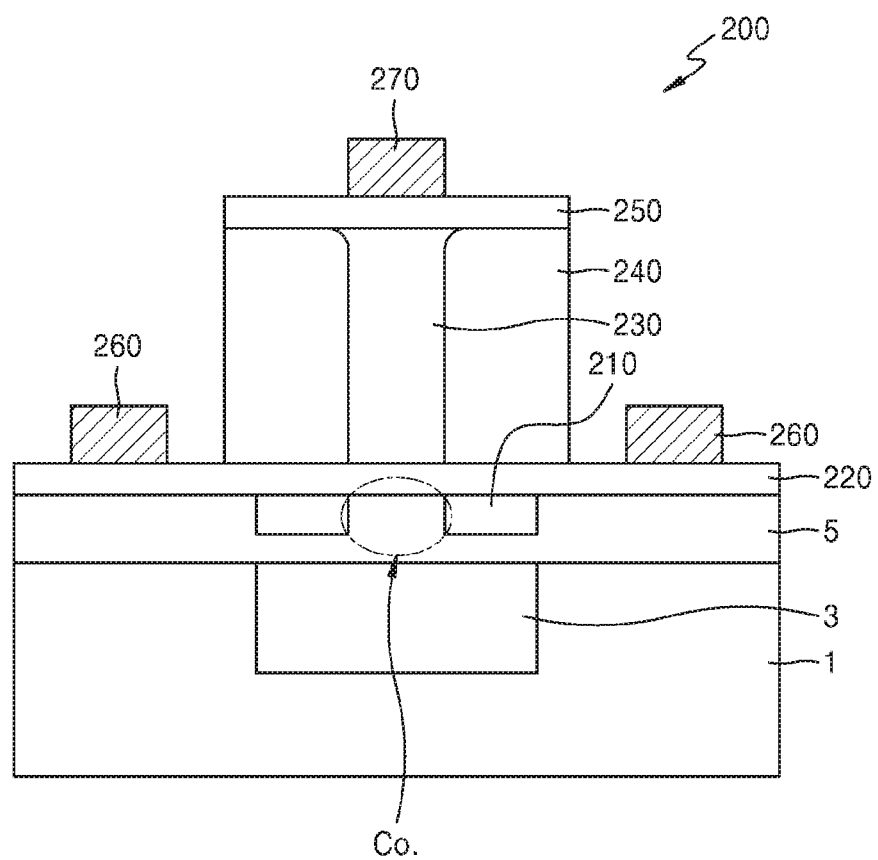
FIG. 8 is a detailed cross-sectional view of the LD of FIG. 7.

FIG. 8 is a detailed cross-sectional view of the LD 200 of FIG. 7.

Referring to FIG. 8, the LD 200 may include the buried insulating layer 3, the epitaxial layer 5, a side cladding layer 210, a lower contact layer 220, an active region 230, quantum implant layers 240, an upper contact layer 250, and metal layers 260 and 270 over the bulk-silicon substrate 1.

The side cladding layer 210 may surround a side surface of a core Co. corresponding to an oval portion marked by a dash-dot line. The side cladding layer 210 may be formed, for example, in an upper portion of the epitaxial layer 5, and may be formed of an insulating layer having a low refractive index such as a silicon oxide film. If necessary, the side cladding layer 210 may pass through the epitaxial layer 5 so that a bottom surface of the side cladding layer 210 may contact the buried insulating layer 3.

Each of the lower contact layer 220 and the upper contact layer 250 may be formed of a conductive material. For example, the lower contact layer 220 may be an N-type material layer, and the upper contact layer 250 may be a P-type material layer. The lower contact layer 220 and the upper contact layer 250 may electrically connect the active region 230 to the metal layers 260 and 270.

The active region 230 is a region where laser light is generated and may include a group III/V gain material. For example, the active region 230 may include a central active layer and upper and lower carrier trapping layers. The carrier trapping layers may be separate confinement hetero (SCH) layers. The active layer may be formed of, for example, p or n-type GaAS, the upper carrier trapping layer that is a p-type SCH layer may be formed of p-type $Al_xGa_{1-x}As$, and the lower carrier trapping layer that is an n-type SCH layer may be formed of n-type $Al_xGa_{1-x}As$. However, materials of the active layer and the carrier trapping layers are not limited thereto.

The quantum implant layers 240 may be located on both side surfaces of the active region 230, and may be a current constriction layer for constricting current. If necessary, a current confinement layer may be formed by using selective lateral oxidation or mesa etching, instead of the quantum implant layers 240. The metal layers 260 and 270 may be respectively formed on the lower contact layer 220 and the upper contact layer 250. The metal layers 260 and 270 may be electrodes for applying current to the active region 230. A p-type cladding layer may be located between the upper contact layer 250 and the active region 230.

A structure of the LD 200 is not limited to that in FIG. 8. For example, in the optical integrated circuit 1000 according to some example embodiments, the LD 200 may be formed to have any of various structures based on the bulk-silicon substrate 1.

In the optical integrated circuit 1000 according to some example embodiments, the LD 200 may be formed based on the bulk-silicon substrate 1. Accordingly, the LD 200 may be made compact and have a low cost. Also, the reliability of the LD 200 may be improved due to the high heat dissipation efficiency of the bulk-silicon substrate 1.

Figure 9:
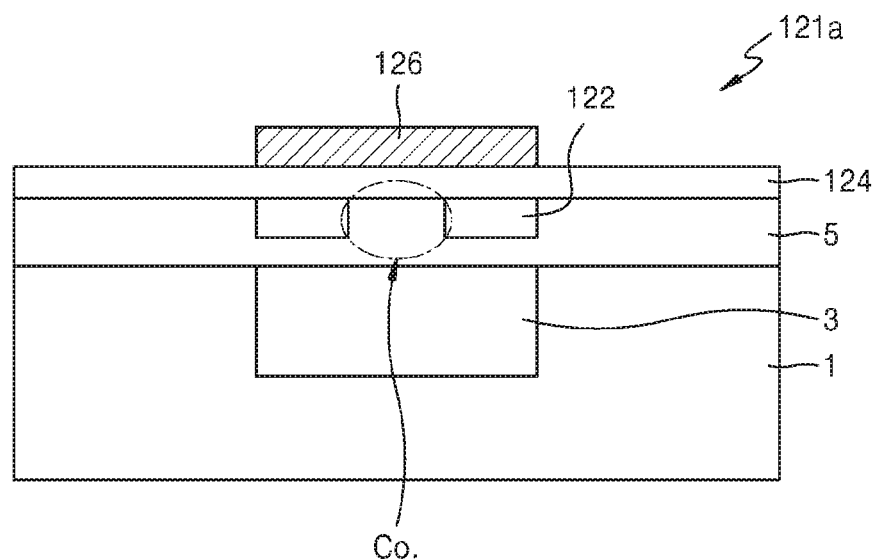
FIG. 9 and FIG. 10 are detailed cross-sectional views of the PS of FIG. 7.
Figure 10:
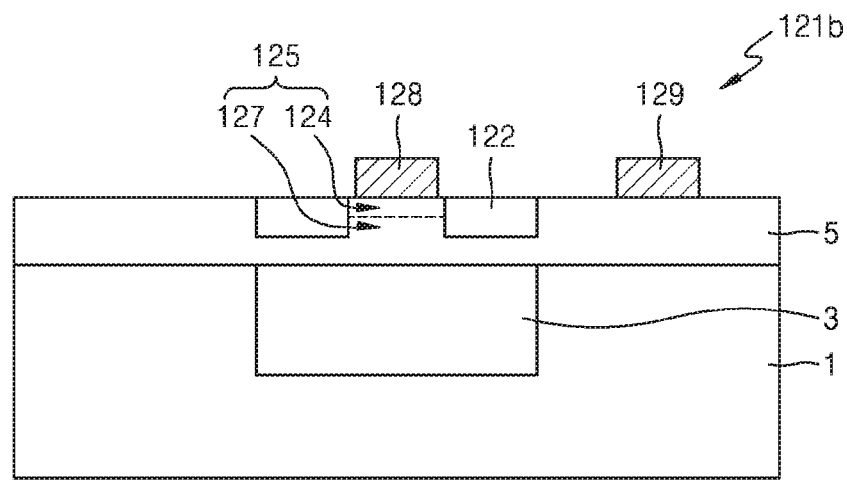

FIGS. 9 and 10 are detailed cross-sectional views of the PS 121 of FIG. 7.

Referring to FIG. 9, in a PS 121a using a thermo-optic effect, a metal heater 126 may be located near (e.g., "proximate to") a waveguide. The PS 121a may include, for example, the buried insulating layer 3, the epitaxial layer 5, a side cladding layer 122, an upper cladding layer 124, and the metal heater 126 over the bulk-silicon substrate 1. Like in the LD 200 of FIG. 8, a portion marked by a dash-dot circle may correspond to the core Co. through which an optical signal passes. The side cladding layer 122 and the upper cladding layer 124 may respectively surround a side surface and a top surface of the core Co. Each of the side cladding layer 122 and the upper cladding layer 124 may be formed of an insulating layer having a refractive index less than that of the core Co. For example, each of the side cladding layer 122 and the upper cladding layer 124 may be formed of an oxide film such as a silicon oxide film. The side cladding layer 122 and the upper cladding layer 124 may be formed of the same material, or may be formed of different materials.

The metal heater 126 may be located on the core Co. and may be formed of chromium (Cr), nickel (Ni), nichrome, tungsten (W), or tungsten silicide (WSix). Heat may be generated by applying current to the metal heater 126, and may locally increase a temperature of a waveguide located under the metal heater 126, that is, the core Co., thereby shifting a phase of light passing through the waveguide. In more detail, a refractive index of the waveguide, that is, the core Co., is changed in proportion to a coefficient of thermal expansion (CTE) of a waveguide material, according to an increased temperature change $\Delta T$. When the temperature change $\Delta T$ is a given value, a refractive index change $\Delta n$ due to a CTE may be defined by using Equation 1.

$$\Delta n = CTE \times \Delta T \qquad (1)$$

When a refractive index of the core Co. is changed, a phase of light is shifted. A phase shift of light according to a change in a refractive index will be explained below with reference to Equation 2. A temperature of the bulk-silicon substrate 1 may be kept constant by using a thermo-electric cooling (TEC) device or a heat dissipation plate so that a temperature does not vary according to time.

Referring to FIG. 10, a PS 121b using a PN diode may shift a phase of an optical signal by vertically applying a voltage to a waveguide through which light passes. For example, the PS 121b may include the buried insulating layer 3, the epitaxial layer 5, the side cladding layer 122, and first and second electrodes 128 and 129 over the bulk-silicon substrate 1. As shown in FIG. 10, a waveguide 125 may have a vertical PN diode structure. In the PN diode structure, an upper layer 124 may be a P-type layer and a lower layer 127 may be an N-type layer, or vice versa. The first electrode 128 may be located on the upper layer 124 and the second electrode 129 may be located on the epitaxial layer 5 so that a reverse voltage is applied to the PN diode structure. As the reverse voltage is applied, a phase of a transmitted optical signal is shifted.

A process of shifting a phase of an optical signal by applying a voltage will now be briefly explained. A carrier density of a waveguide is changed when a voltage is applied, and thus a refractive index of the waveguide is changed. A refractive index change $\Delta n$ and a phase change have a relationship defined by using Equation 2.

$$L_\pi = \lambda/\Delta n \qquad (2)$$

In Equation 2, $L_\pi$ is a length of the waveguide through which light passes to have a phase change of $\pi$, and $\lambda$ is a wavelength of the optical signal. Referring to Equation 2, $L_\pi$ decreases as the refractive index change $\Delta n$ increases. If a length of the waveguide is fixed, a phase change over the entire waveguide increases as the refractive index change $\Delta n$ increases.

Although the PS 121a of FIG. 9 or the PS 121b of FIG. 10 uses a metal heater or a PN diode structure, respectively, a structure of the PS is not limited thereto. For example, in the optical integrated circuit 1000 according to some example embodiments, the PS may have a PIN diode structure, a MOS transistor structure, or a SISCAP structure. Furthermore, in the optical integrated circuit 1000 according to some example embodiments, the PS may be formed to have any of various structures other than the above structures based on the bulk-silicon substrate 1.

In the optical integrated circuit 1000 according to some example embodiments, the PS 121a or 121b may be formed based on the bulk-silicon substrate 1. Accordingly, the PS 121a or 121b may be made to be compact and with a low cost. Also, the PS 121a or 121b may have improved reliability due to the high heat dissipation efficiency of the bulk-silicon substrate 1.

Figure 11:
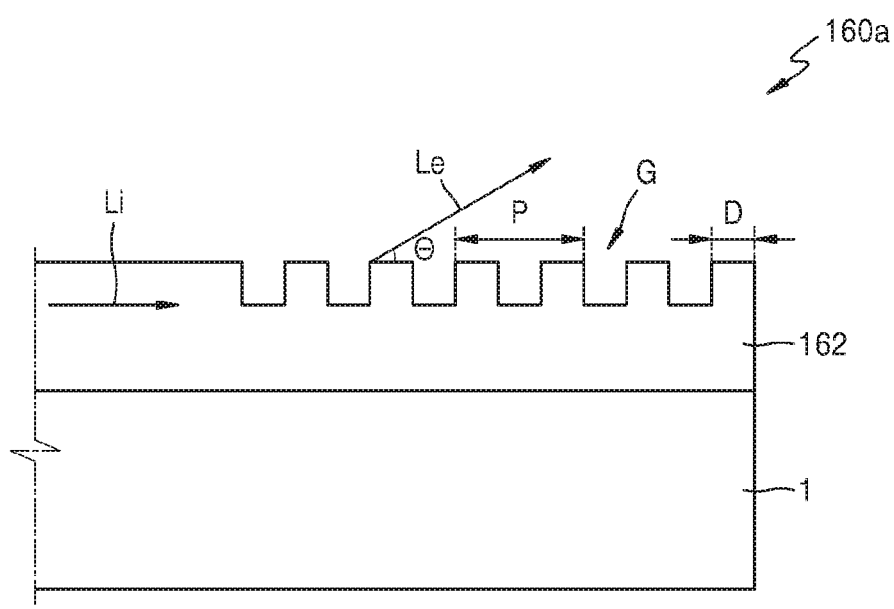
FIG. 11 is a cross-sectional view of an antenna formed on the bulk-silicon substrate in the optical integrated circuit according to some example embodiments.

FIG. 11 is a cross-sectional view of an antenna 160a formed on the bulk-silicon substrate 1 in the optical integrated circuit 1000 according to some example embodiments.

Referring to FIG. 11, the antenna 160a may include an antenna layer 162 formed on the bulk-silicon substrate 1. A grating G may be formed in a top surface of the antenna layer 162. The antenna layer 162 may be, for example, the epitaxial layer 5 (see FIG. 7). The antenna layer 162 may be integrally formed with a waveguide located on a front end of the antenna layer 162. The waveguide may be formed so that a cladding layer surrounds a core of the epitaxial layer, and the core may be coupled to the antenna layer 162. Since an optical signal travels through the antenna layer 162, the antenna layer 162 may correspond to a waveguide. Accordingly, the antenna 160a may have a structure in which a grating G is formed in a waveguide.

An optical signal Li may be incident from the core to the antenna layer 162. When portions of the grating G are periodically arranged in the antenna layer 162, since refractive indices at the portions of the grating G are non-uniform, the incident optical signal Li is converted into a radiation wave Le and is radiated outward at a predetermined angle θ. A mode of an optical signal incident on the antenna layer 162 may be selected by adjusting a refractive index of the antenna layer 162, and by adjusting a pitch P and a thickness D of the grating G. For example, only a lowermost basic mode of the input optical signal Li may travel to the antenna layer 162.

A structure of the antenna 160a is not limited to that in FIG. 11. For example, in the optical integrated circuit 1000 according to some example embodiments, an antenna may include a core in which a tilted Bragg grating or a long period grating is formed, and a cladding layer in which at least one V-groove is formed, with the cladding layer surrounding the core. Furthermore, in the optical integrated circuit 1000 according to some example embodiments, an antenna may be formed to have any of various structures other than the above structures based on the bulk-silicon substrate 1.

In the optical integrated circuit 1000 according to some example embodiments, the antenna 160a may be formed based on the bulk-silicon substrate 1. Accordingly, the antenna 160a may be made to be compact and with a low cost. Also, the antenna 160a may be formed so that unit antennas having the same interval and the same size are arranged in an array on the bulk-silicon substrate 1. Therefore, a radiation direction of output optical signal may be controlled uniformly in the antenna 160*a*.

Figure 12:
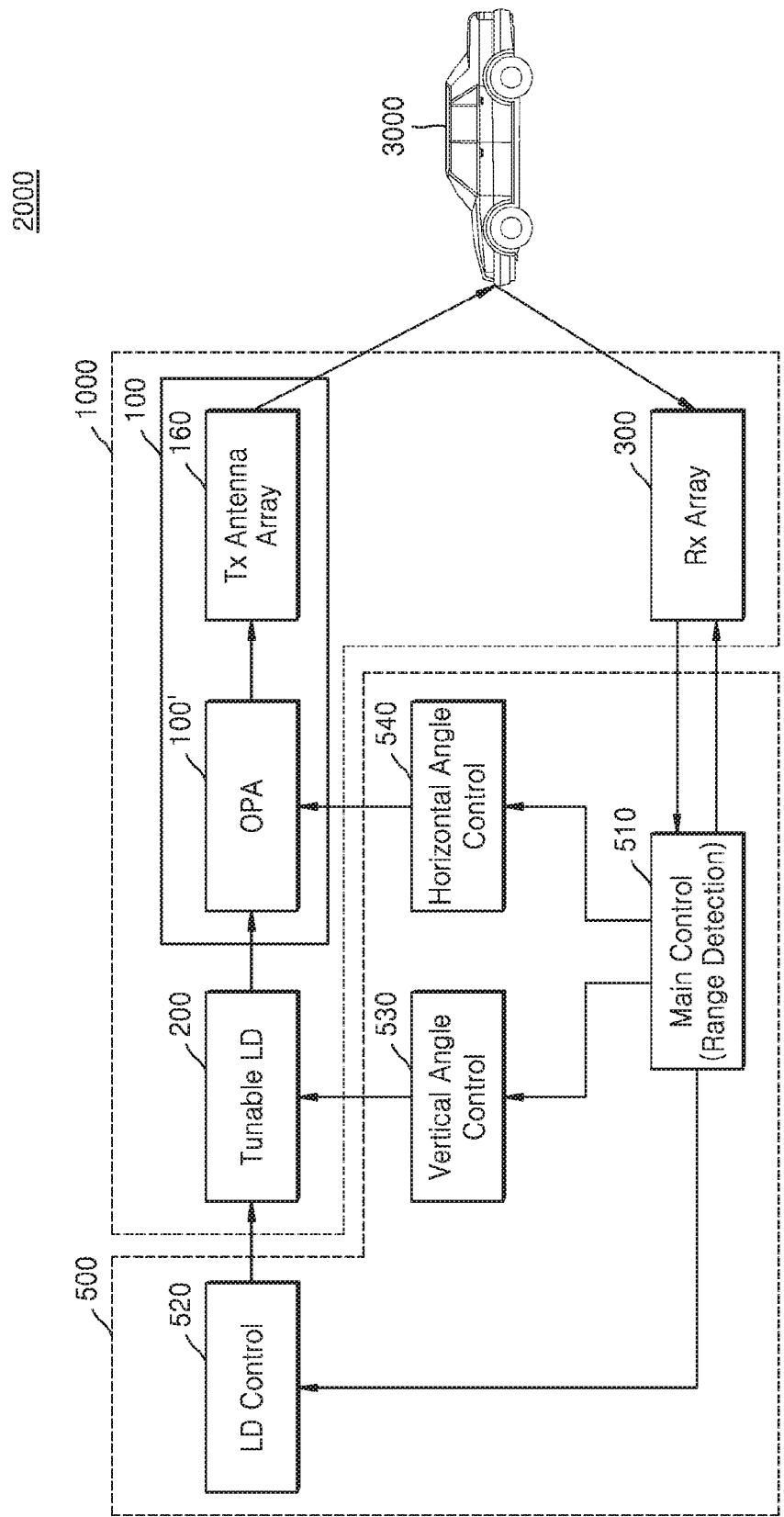
FIG. 12 is a diagram illustrating a configuration of a light detection and ranging (LiDAR) system including the OPA according to some example embodiments.

FIG. 12 is a diagram illustrating a configuration of a LiDAR system 2000 including the OPA 100 according to some example embodiments.

Referring to FIG. 12, the LiDAR system 2000 according to some example embodiments may include the OPA 100, the LD 200, the receiver 300, and a controller 500. As shown in FIG. 12, in some example embodiments, one or more LiDAR systems 2000 may be included in one or more portions of a vehicle 3000, including an automobile. The vehicle 3000 may include a vehicle that is configured to be driven ("navigated") manually (e.g., based on manual interaction with one or more driving instruments of the vehicle 3000 by at least one occupant of the vehicle 3000), a vehicle that is configured to be driven ("navigated") autonomously (e.g., an autonomous vehicle configured to be driven based on at least partial computer system control of the vehicle 3000 with or without input from vehicle 3000 occupant(s)), some combination thereof, or the like. For example, in some example embodiments, the vehicle 3000 may be configured to be driven ("navigated") through an environment based on generation of data by one or more LiDAR systems 2000 included in the vehicle 3000. Such navigation may include the vehicle 3000 being configured to navigate through an environment, in relation to an object located in the environment, based on data generated by the LiDAR system as a result of the LiDAR system emitting a laser beam into the environment and detecting the object in the environment, where the LiDAR system may detect the object based on detecting a reflection and/or scattering of the emitted laser beam off of the object.

In some example embodiments, based on the OPA providing improved reliability, improved compactness, and reduced cost, the OPA may enable a vehicle 3000 to be configured to implement autonomous navigation of an environment, via incorporation of a LiDAR system that includes the OPA, with improved reliability, reduced cost, and reduced space requirements within the vehicle 300 to incorporate the LiDAR system that may enable environment monitoring to further enable autonomous navigation through the environment.

The OPA 100 has been described with reference to FIG. 1. However, the antenna 160 from which an optical signal is output is separate from other elements in FIG. 12. Accordingly, an OPA 100' may include elements other than the antenna 160 from among elements of the OPA 100, for example, the splitter 110, the sets of first PSs 120, the second PS 130, the input SOA 170, and the output SOAs 180.

The receiver 300 may include a photodiode based on the bulk-silicon substrate 1 as described with reference to FIG. 6. In the LiDAR system 2000 according to some example embodiments, the receiver 300 may be formed so as to include a plurality of photodiodes arranged as an array structure. In order to emphasize the array structure of the receiver 300, 'Rx array' is used to indicate the receiver 300 in FIG. 12. The antenna 160 may also be formed based on the bulk-silicon substrate 1 such that a plurality of unit antennas are arranged in an array. Accordingly, 'Tx Antenna Array' is used to indicate the antenna 160 in FIG. 12.

The controller 500 may include an LD controller 520, a vertical angle controller 530, a horizontal angle controller 540, and a main controller 510. The LD controller 520 controls light output from the LD 200. For example, the LD controller 520 may control a power supply to the LD 200, switching on/off of the LD 200, and the generation of Pulse Waves (PWs) or Continuous Waves (CWs) of the LD 200.

The vertical angle controller 530 may control a vertical angle of an optical signal output from the antenna 160 by adjusting a wavelength or a frequency of output light from the LD 200. The horizontal angle controller 540 may control a horizontal angle of an optical signal output from the antenna 160 by adjusting the OPA 100'. When the OPA 100' is adjusted, it may mean that a phase of an optical signal is adjusted by adjusting a physical quantity, for example, the amount of current, applied to the first PS 121 or the second PS 130 of the OPA 100'. When a phase of an optical signal is shifted, a direction in which the optical signal is output from the antenna 160, for example, a horizontal angle of the optical signal, may be changed.

The main controller 510 may control overall operations of the LD controller 520, the vertical angle controller 530, the horizontal angle controller 540, and the receiver 300. Also, the main controller 510 may receive information about an optical signal reflected from the receiver 300 and may calculate a distance to an object. For example, the main controller 510 may calculate a distance to an object by using a time of flight (TOF) technology.

The TOF technology is a technology for measuring a distance to an object by using a signal such as near-infrared rays, ultrasonic waves, or a laser. In detail, the TOF technology calculates a distance by measuring a time difference between when a signal is emitted to an object and when the signal is reflected from the object. In the TOF technology, since a transmitter applies a signal and a receiver receives a signal reflected from an object to measure a travel time of the signal, the transmitter and the receiver may be slightly spaced apart from each other in one device. Also, since the signal from the transmitter may affect the receiver, a shielding film may be between the transmitter and the receiver.

The transmitter sends an optical signal modulated at a specific frequency f, and the receiver detects an optical signal reflected from an object. A phase change due to a time taken for the optical signal to travel to and from the object may be detected, and a distance to the object may be calculated as shown in Equation 3.

$$D=c/(2f)*(n+\theta/(2\pi)) \tag{3}$$

In Equation 3, D may be a distance of measurement, c may be a speed of light, f may be a frequency of an optical signal, n may be a constant when a phase cycle is repeated, and $\theta$ may be a phase of the received optical signal.

When a maximum value of the distance of measurement D is determined and the constant n is assumed to be 0, the distance of measurement D may be defined by using Equation 4.

$$D=c\theta/(4\pi f) \tag{4}$$

In the LiDAR system 2000 according to some example embodiments, the OPA 100, the LD 200, and the receiver 300 may be integrated together in the bulk-silicon substrate 1. In FIG. 12, the OPA 100, the LD 200, and the receiver 300 are together surrounded by a dashed line in order to indicate that the OPA 100, the LD 200, and the receiver 300 are integrated in the bulk-silicon substrate 1. An arrangement of the OPA 100, the LD 200, and the receiver 300, integrated together in the bulk-silicon substrate 1, may correspond to the optical integrated circuit 1000 of FIG. 6.

Figure 13A:
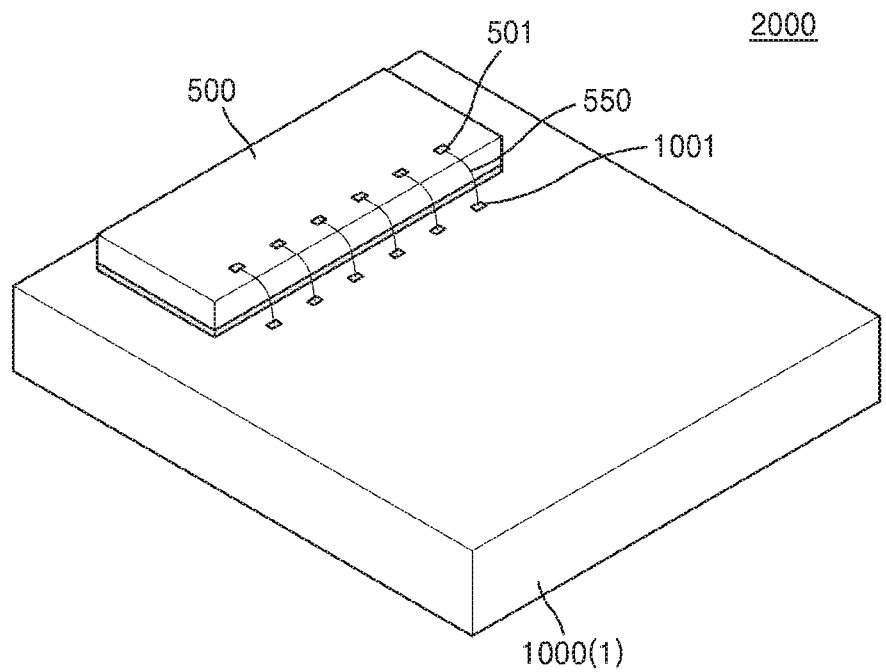
FIG. 13A and FIG. 13B are perspective views of the LiDAR system of FIG. 12.
Figure 13B:
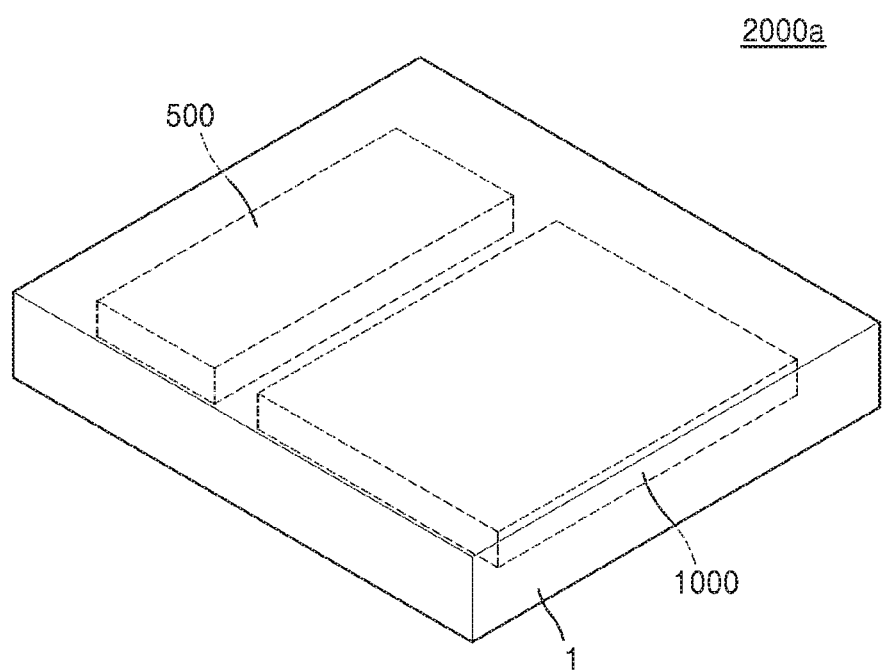

In the controller 500, the LD controller 520, the vertical angle controller 530, the horizontal angle controller 540, and the main controller 510 may each be formed as one chip, or may be integrated together into one chip. Accordingly, a dashed line marking the controller 500 may not indicate that the LD controller 520, the vertical angle controller 530, the horizontal angle controller 540, and the main controller 510 are integrated together, but may indicate that the LD controller 520, the vertical angle controller 530, the horizontal angle controller 540, and the main controller 510 are included as elements in the controller 500. If necessary, the controller 500 may be integrated in the bulk-silicon substrate 1 of the optical integrated circuit 1000. FIGS. 13A and 13B are perspective views of the LiDAR system 2000 of FIG. 12.

Referring to FIG. 13A, the LiDAR system 2000 according to some example embodiments may include the optical integrated circuit 1000 and the controller 500. The optical integrated circuit 1000 may have a structure in which the OPA 100, the LD 200, and the receiver 300 are integrated together in the bulk-silicon substrate 1. For example, the optical integrated circuit 1000 may be the optical integrated circuit 1000 of FIG. 6.

As shown in FIG. 13A, the controller 500 may be provided as one chip. For example, the LD controller 520, the vertical angle controller 530, the horizontal angle controller 540, and the main controller 510 constituting the controller 500 may be integrated together into one chip. Also, the controller 500 may be attached to the optical integrated circuit 1000 by using an adhesive or the like, and may be electrically connected to the optical integrated circuit 1000 through wire bonding. For use in wire bonding, a plurality of first pads 501 may be formed on the controller 500 and a plurality of second pads 1001 may be formed on the optical integrated circuit 1000. The first pads 501 may be connected through wires 550 to the second pads 1001.

Although not shown in FIG. 13A, to prevent physical or chemical damage to the optical integrated circuit 1000 and the controller 500, the LiDAR system 2000 according to some example embodiments may have a package structure in which the optical integrated circuit 1000 and the controller 500 are sealed by a sealing member.

Referring to FIG. 13B, a LiDAR system 2000a according to some example embodiments may be similar to the LiDAR system 2000 of FIG. 13A in that the LiDAR system 2000a includes the optical integrated circuit 1000 and the controller 500. However, in the LiDAR system 2000a according to some example embodiments, the optical integrated circuit 1000 and the controller 500 may be integrated together in the bulk-silicon substrate 1. Accordingly, the LiDAR system 2000a may have a reduced size and improved reliability. The LiDAR system 2000a according to some example embodiments may also have a package structure.

An OPA for beam steering according to the inventive concepts may improve the reliability of beam steering by changing directions of optical signals from antennas by using PSs. Also, the OPA may have a compact design and a low cost as beam steering is performed by using a relatively small number of PSs.

Also, in an optical integrated circuit according to the inventive concepts, an OPA for beam steering, an LD, and a receiver may be integrated together in a bulk-silicon substrate by using a silicon photonics technology. Accordingly, an optical device system having a low cost, a compact design, and high reliability may be provided.

For example, since an optical integrated circuit according to the inventive concepts constitutes a LiDAR system along with controllers for controlling an OPA for beam steering, an LD, and a receiver, the LiDAR system may have improved reliability, a compact design, and a low cost.

While the inventive concepts has been particularly shown and described with reference to example embodiments thereof, it will be understood that various changes in form and details may be made therein without departing from the spirit and scope of the following claims. Accordingly, the true technical scope of the inventive concepts is defined by the appended claims.

What is claimed is:

1. An optical phased array (OPA), the OPA comprising:
a set of splitters, each splitter configured to split an input optical signal in a ratio of 1:1 and output the split input optical signal, each splitter including an input end and a set of two output ends, each set of two output ends including a first output end and a second output end, the set of splitters having a full binary tree structure including M branch positions, M being an integer equal to or greater than 1, such that the full binary tree structure is configured to enable a branch operation to be performed M times, each splitter located at a branch position of the full binary tree structure;
a plurality of sets of first phase shifters (PSs), each set of first PSs located exclusively at a first output end of each splitter, of the set of two output ends of each splitter, respectively, each given set of first PSs including a particular quantity of first PSs based on a branch position, of the M branch positions, of the first output end at which the given set of first PSs is located; and
a set of antennas connected to separate, respective output ends of a sub-set of splitters, of the set of splitters, that are located at an $M^{th}$ branch position of the M branch positions, the set of antennas corresponding to N channels, N being equal to $2^M$.

2. The OPA of claim 1, wherein,
the particular quantity of first PSs included in a set of first PSs located at the first output end of a splitter that is located at an $i^{th}$ branch position of the M branch positions is $2^{M-i}$, i being an integer having a value inclusively between 1 and M; and
each set of first PSs located at a branch position that is inclusively between a $1^{st}$ branch position of the M branch positions and an (M−1) branch position of the M branch positions includes a plurality of first PSs connected in series.

3. The OPA of claim 1, further comprising:
a set of N second PSs collectively located at all output ends of the $M^{th}$ splitters; or
a set of N−1 second PSs located at all but one of the output ends of the $M^{th}$ splitters.

4. The OPA of claim 3, wherein a total quantity of first PSs and second PSs included in the OPA is one of,
$N/2*\log_2 N+N$ based on the second PSs being included in the set of N second PSs collectively located at all output ends of the $M^{th}$ splitters, and
$N/2*\log_2 N+(N-1)$ based on the second PSs being included in the set of N−1 second PSs located at all but one of the output ends of the $M^{th}$ splitters.

5. The OPA of claim 2, wherein,
each first PS is configured to shift a phase of a separate input optical signal, such that the set of antennas are each configured to output an optical signal having a different phase, and
each second PS is configured to correct a variation of optical signals of a separate antenna of the set of antennas.

6. The OPA of claim 1, wherein each first PS is configured to shift a phase of a separate input optical signal based on applying, to a waveguide of the first PS, at least one of, heat,
light,
current,
voltage, and
pressure.

7. The OPA of claim 1, wherein each first PS is at least one of,
a metal heater located proximate to a waveguide of the first PS,
a PIN PS that is configured to horizontally apply current to the waveguide,
a PN PS that is configured to horizontally apply a voltage to the waveguide, and
a silicon-insulator-silicon capacitive (SISCAP) PS that is configured to vertically apply a voltage to the waveguide.

8. The OPA of claim 1, wherein each splitter is a Y-branch splitter.

9. The OPA of claim 1, further comprising:
a set of second PSs located at separate, respective output ends of the $M^{th}$ splitters,
wherein the plurality of sets of first PSs are configured to be controlled according to a steering signal,
wherein the set of second PSs are configured to be controlled according to a trimming signal.

10. The OPA of claim 9, wherein,
the plurality of sets of first PSs are connected in series between a common input pad and a common output pad, such that the OPA is configured to apply the steering signal to an entirety of the plurality of sets of first PSs through the common input pad and the common output pad, and
each second PS is connected to a separate output pad and a separate input pad, such that the OPA is configured to individually apply the trimming signal to each second PSs through the separate, respective output pads and input pads.

11. An optical integrated circuit, comprising:
a wavelength-tunable laser diode (LD);
an optical phased array (OPA) configured to equally split an optical signal from the wavelength-tunable LD to N channels based on performing a branch operation M times and outputting the split optical signal in one or more particular directions through a set of antennas corresponding to the N channels, M being an integer equal to or greater than 1, N being equal to $2^M$; and
a receiver configured to receive an optical signal reflected from an object based on the split optical signal being outputted,
wherein the wavelength-tunable LD, the OPA, and the receiver are integrated in a bulk-silicon substrate,
wherein the OPA includes,
a set of 1×2 splitters, each 1×2 splitter configured to equally split an input optical signal into two output signals and output the two output signals, the set of 1×2 splitters having a cascading structure including M branch positions, such that the cascading structure is configured to enable a branch operation to be performed M times, wherein the set of antennas are connected to separate, respective output ends of a sub-set of 1×2 splitters, of the set of 1×2 splitters, that are located at an Mt branch position of the M branch positions, and
a plurality of sets of first phase shifters (PSs), each set of first PSs located exclusively on a first output end of each 1×2 splitter, of the set of two output ends of each 1×2 splitter, respectively, each given set of first PSs including a particular quantity of first PSs based on a branch position, of the M branch positions, of the first output end at which the given set of first PSs is located.

12. The optical integrated circuit of claim 11, wherein the OPA includes,
a set of second PSs located at front ends of separate, respective antennas of the set of antennas.

13. The optical integrated circuit of claim 12, wherein
$2^{i-1}$ 1×2 splitters are located at an $i^{th}$ branch position of the M branch positions, i being inclusively between 1 and M, such that a total quantity of splitters of the set of 1×2 splitters in the OPA is $2^M-1$,
$2^{M-i}$ first PSs are located at the first output end of the 1×2 splitters that are located at the $i^{th}$ branch position, such that a total quantity of first PSs in the plurality of sets of first PSs in the OPA is $N/2*\log_2 N$, and
a total quantity of second PSs of the set of second PSs included in the OPA is one of
N based on the set of second PSs being included in a set of N second PSs collectively located at output ends of an entirety of N/2 1×2 splitters located at the $M^{th}$ branch position, and
N−1 based on the set of second PSs being included in a set of N−1 second PSs collectively located at output ends of N/2−1 1×2 splitters of N/2 1×2 splitters located at the $M^{th}$ branch position.

14. The optical integrated circuit of claim 11, wherein,
the OPA further includes,
a buried insulating layer in an upper portion of the bulk-silicon substrate, and
an epitaxial layer on the bulk-silicon substrate and the buried insulating layer; and
the wavelength-tunable LD and the OPA include at least a portion of the buried insulating layer and the epitaxial layer.

15. An optical phased array (OPA), comprising:
a cascading structure of splitters configured to enable a branch operation to be performed M times, the cascading structure of splitters having M branch positions, the cascading structure of splitters further including $2^{i-1}$ splitters at an $i^{th}$ branch position of the M branch positions, each splitter configured to split an input optical signal in a ratio of 1:1 and output the split input optical signal, each splitter including an input end and a set of two output ends, each set of two output ends including a first output end and a second output end, M being an integer equal to or greater than 1, i being inclusively between 1 and M; and
a plurality of sets of first phase shifters (PSs), each set of first PSs located exclusively at one output end of a separate splitter, of a set of two output ends of the separate splitter, respectively, each set of first PSs including a particular quantity of first PSs based on a branch position, of the M branch positions, at which the separate splitter is located.

16. The OPA of claim 15, further comprising:
a set of N antennas connected to separate, respective output ends of a sub-set of splitters, of the cascading structure of splitters, that are located at an $M^{th}$ branch position of the M branch positions, respectively.

17. The OPA of claim 16, further comprising:
a set of second PSs located at front ends of separate, respective antennas of one of
an entirety of the set of N antennas, or
N−1 antennas of the set of N antennas.

18. The OPA of claim 17, wherein
- each first PS is configured to shift a phase of a separate input optical signal, such that the set of N antennas are each configured to output an optical signal having a different phase, and
- each second PS is configured to correct a variation of optical signals of a separate antenna of the set of N antennas.

19. The OPA of claim 15, wherein the OPA is configured to be included in a light detection and ranging (LiDAR) system, the LiDAR system further including,
- a wavelength-tunable laser diode (LD) configured to emit a light beam, wherein the OPA is configured to receive the emitted light beam as the input optical signal to the splitter located at a $1^{st}$ branch position of the M branch positions;
- a receiver configured to receive an optical signal output from the OPA and reflected from an object; and
- a controller configured to control the wavelength-tunable LD, the OPA, and the receiver.

20. The OPA of claim 19, wherein,
- the LiDAR system is configured to be included in a vehicle, such that the LiDAR system is configured to enable the vehicle to be autonomously navigated in relation to the object based at least in part upon data generated by the LiDAR system.

* * * * *